United States Patent
Fan et al.

(10) Patent No.: US 11,778,070 B2
(45) Date of Patent: Oct. 3, 2023

(54) ETHERNET HEADER COMPRESSION METHOD AND APPARATUS AND ETHERNET HEADER DECOMPRESSION METHOD AND APPARATUS

(71) Applicant: HUAWEI TECHNOLOGIES CO., LTD., Shenzhen (CN)

(72) Inventors: Qiang Fan, Shanghai (CN); Chong Lou, Shanghai (CN); Xiaoying Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/669,681

(22) Filed: Feb. 11, 2022

(65) Prior Publication Data

US 2022/0166854 A1    May 26, 2022

Related U.S. Application Data

(63) Continuation of application No. PCT/CN2019/100900, filed on Aug. 15, 2019.

(51) Int. Cl.
*H04L 69/22* (2022.01)
*H04L 69/04* (2022.01)

(52) U.S. Cl.
CPC .............. *H04L 69/04* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2019/0124572 A1* | 4/2019 | Park | H04W 36/0088 |
| 2021/0266385 A1* | 8/2021 | Lu | H04L 69/04 |

(Continued)

FOREIGN PATENT DOCUMENTS

| | | |
|---|---|---|
| CN | 101453298 A | 6/2009 |
| CN | 102083137 A | 6/2011 |
| CN | 104079488 A | 10/2014 |

(Continued)

OTHER PUBLICATIONS

International Search Report issued in corresponding International Application No. PCT/CN2019/100900, dated May 14, 2020, pp. 1-9.

(Continued)

*Primary Examiner* — James A Edwards
(74) *Attorney, Agent, or Firm* — HUAWEI TECHNOLOGIES CO., LTD.

(57) ABSTRACT

An Ethernet header compression method and apparatus and an Ethernet header decompression method and apparatus. After receiving an Ethernet frame including a first to-be-compressed field, a compression end compresses an Ethernet header of the Ethernet frame based on a first correspondence including first compression information and a value of the first to-be-compressed field and the first compression information. Correspondingly, a decompression end decompresses an Ethernet header of a compressed Ethernet frame based on the first correspondence when receiving the compressed Ethernet frame. In the embodiments of this application, because the Ethernet header of the Ethernet frame is compressed, communication resources is saved.

12 Claims, 15 Drawing Sheets

(56) References Cited

U.S. PATENT DOCUMENTS

2021/0377797 A1* 12/2021 Lu ........................ H04L 69/22
2022/0150332 A1* 5/2022 Yang ..................... H04L 69/22

FOREIGN PATENT DOCUMENTS

| CN | 107094142 A | 8/2017 |
| CN | 108028728 A | 5/2018 |
| CN | 108574656 A | 9/2018 |
| CN | 109391963 A | 2/2019 |
| WO | 2018196491 A1 | 11/2018 |

OTHER PUBLICATIONS

Huawei, HiSilicon, Structure-aware Ethernet header compression. 3GPP TSG-RAN WG2 #105bis, Xian, China, Apr. 8-12, 2019, R2-1904388, 4 pages.

Huawei, HiSilicon, Discussion on structure-aware Ethernet header compression. 3GPP TSG-RAN WG2 Meeting 106, Reno, USA, May 13-17, 2019, R2-1907332, 3 pages.

Extended European Search Report issued in corresponding European Application No. 19941327.9, dated Jun. 21, 2022, pp. 1-11.

Chinese Office Action issued in corresponding Chinese Application No. 201980098681.0, dated Dec. 27, 2022, pp. 1-16.

\* cited by examiner

ETHERNET HEADER COMPRESSION METHOD AND APPARATUS AND ETHERNET HEADER DECOMPRESSION METHOD AND APPARATUS

CROSS-REFERENCE TO RELATED APPLICATIONS

This application is a continuation of International Application No. PCT/CN2019/100900, filed on Aug. 15, 2019, the disclosure of which is hereby incorporated by reference in its entirety.

BACKGROUND

In a conventional industrial control field, automatic control is implemented through a wired connection. However, a wired connection deployment manner makes cable deployment and maintenance costs high, and mobility of a controlled end is poor due to a limitation of a cable. Therefore, industrial control using wireless transmission instead of the wired connection has gained more and more attention. An Ethernet technology is used for most industrial control networks during deployment. When a wired network is replaced with a wireless network, an Ethernet frame is transmitted between a control end and a controlled end through the wireless network. Therefore, the Ethernet frame needs to be transmitted in the wireless network. Transmission of the Ethernet frame in the wireless network uses high resource overheads, but radio resources are limited. Therefore, overheads of the transmission of the Ethernet frame in the wireless network is expected to be reduced.

SUMMARY

This application provides an Ethernet header compression method and apparatus and an Ethernet header decompression method and apparatus, to reduce occupation of Ethernet communication resources by an Ethernet header.

According to a first aspect, an Ethernet header compression method is provided, including: receiving, by a compression end, a first Ethernet frame, where an Ethernet header of the first Ethernet frame includes a first to-be-compressed field; determining, by the compression end, first compression information of the Ethernet header of the first Ethernet frame based on a first correspondence and the first to-be-compressed field, where the first correspondence includes a correspondence between the first compression information and a value of the first to-be-compressed field, and the first compression information includes a first context identifier CID; and compressing, by the compression end, the Ethernet header of the first Ethernet frame based on the first compression information.

In addition, a compression apparatus is provided, including a unit or a means (means) configured to perform each step in the foregoing first aspect.

In addition, a compression apparatus is provided, including a processor and an interface circuit. The processor is configured to: communicate with another apparatus through the interface circuit, and perform the method provided in the first aspect. There are one or more processors.

In addition, a compression apparatus is provided, including a processor, configured to invoke a program stored in a memory, to perform the method provided in the first aspect. The memory is located inside the apparatus, or is located outside the apparatus. In addition, there are one or more processors.

In addition, a computer program is provided. When the program is invoked by a processor, the method provided in the first aspect is performed.

In addition, a computer-readable storage medium is provided, including the foregoing program.

After receiving the first Ethernet frame including the first to-be-compressed field, the compression end compresses the Ethernet header of the first Ethernet frame based on the first correspondence including the first compression information and the value of the first to-be-compressed field and the first compression information. Because the Ethernet header of the first Ethernet frame is compressed, communication resources is saved.

Optionally, in the first aspect or various implementations of the first aspect, the first correspondence is generated when a correspondence stored by the compression end does not include the value of the first to-be-compressed field of the first Ethernet frame, where the correspondence stored by the compression end includes a correspondence between at least one piece of compression information and a value of a to-be-compressed field.

Optionally, in the first aspect or various implementations of the first aspect, the compression end sends the first correspondence to a decompression end.

Optionally, in the first aspect or various implementations of the first aspect, the sending, by the compression end, the first correspondence to a decompression end includes: sending, by the compression end, an uncompressed data packet to the decompression end, where the uncompressed data packet includes the first correspondence.

Optionally, in the first aspect or various implementations of the first aspect, the sending, by the compression end, the first correspondence to a decompression end includes: sending, by the compression end, the first correspondence to the decompression end by using a first packet data convergence protocol data protocol data unit PDCP data PDU, where the first PDCP data PDU includes a first Ethernet header compression EHC header, the first EHC header includes a first indication field, the first CID, and an Ethernet header of a second Ethernet frame, a value of a to-be-compressed field in the Ethernet header of the second Ethernet frame is equal to the value of the first to-be-compressed field, and the first indication field is used to indicate whether the first EHC header includes a complete Ethernet header.

Optionally, in the first aspect or various implementations of the first aspect, the first EHC header further includes a first profile identifier profile ID.

Optionally, in the first aspect or various implementations of the first aspect, the first indication field is further used to indicate that the first EHC header includes the first profile ID.

Optionally, in the first aspect or various implementations of the first aspect, the first PDCP data PDU further includes a PDCP header, a service data adaptation protocol SDAP header, an Ethernet data payload, and a message authentication code for integrity MAC-I.

Optionally, in the first aspect or various implementations of the first aspect, the sending, by the compression end, the first correspondence to a decompression end includes:

sending, by the compression end, the first correspondence to the decompression end by using a packet data convergence protocol control protocol data unit PDCP control PDU, where the PDCP control PDU includes first indication information, the first CID, and the value of the first to-be-compressed field, and the first indication information is used to indicate that the PDCP control PDU is used to transmit the first correspondence.

Optionally, in the first aspect or various implementations of the first aspect, the PDCP control PDU further includes a first profile ID.

Optionally, in the first aspect or various implementations of the first aspect, the method further includes: sending, by the compression end, a first PDCP data PDU to the decompression end, where the first PDCP data PDU includes a first EHC header, the first EHC header includes a first indication field and an Ethernet header of a second Ethernet frame, a value of a to-be-compressed field in the Ethernet header of the second Ethernet frame is equal to the value of the first to-be-compressed field, and the first indication field is used to indicate whether the first EHC header carries the first CID.

Optionally, in the first aspect or various implementations of the first aspect, when the first EHC header carries the first CID, the Ethernet header of the second Ethernet frame is a compressed Ethernet header; or when the first EHC header does not carry the first CID, the Ethernet header of the second Ethernet frame is a complete Ethernet header.

Optionally, in the first aspect or various implementations of the first aspect, the first PDCP data PDU further includes a PDCP header, a service data adaptation protocol SDAP header, an Ethernet data payload, and a message authentication code for integrity MAC-I.

Optionally, in the first aspect or various implementations of the first aspect, the sending, by the compression end, the first correspondence to a decompression end includes: sending, by the compression end, the first correspondence to the decompression end for a plurality of times.

Optionally, in the first aspect or various implementations of the first aspect, the method further includes: receiving, by the compression end, feedback information from the decompression end, where the feedback information is used to indicate a receiving status of the first correspondence.

Optionally, in the first aspect or various implementations of the first aspect, the feedback information includes the first CID.

Optionally, in the first aspect or various implementations of the first aspect, the feedback information further includes at least one of the following: the first profile ID, a second indication field, and a third indication field, the second indication field is used to indicate that the first correspondence is a newly added correspondence or a modified correspondence at the decompression end, and the third indication field is used to indicate that the feedback information is a positive feedback or a negative feedback.

Optionally, in the first aspect or various implementations of the first aspect, the compression end further stores an indication variable of the correspondence, and the indication variable is used to indicate whether compression information of the correspondence is used for compression.

Optionally, in the first aspect or various implementations of the first aspect, the method further includes: sending, by the compression end, the first correspondence to a decompression end when a correspondence stored by the compression end includes the first correspondence corresponding to the first to-be-compressed field, and an indication variable of the first correspondence is used to indicate that compression information of the first correspondence is not used for compression.

Optionally, in the first aspect or various implementations of the first aspect, the method further includes: setting, by the compression end, the indication variable to a first value when the compression end determines that the first correspondence is correctly received by the decompression end, where the first value is used to indicate that the compression information is used for compression.

Optionally, in the first aspect or various implementations of the first aspect, the first compression information further includes the first profile ID.

Optionally, in the first aspect or various implementations of the first aspect, the method further includes: sending, by the compression end, second indication information to the decompression end, where the second indication information is used to indicate that the first correspondence is a newly added correspondence or a modified correspondence at the compression end.

Optionally, in the first aspect or various implementations of the first aspect, the method further includes: sending, by the compression end, a compressed first Ethernet frame to the decompression end, where the compressed first Ethernet frame includes the first CID and does not include a profile identifier profile ID.

In this case, because the compressed Ethernet frame does not include the profile ID, space occupation is reduced.

Optionally, in the first aspect or various implementations of the first aspect, the sending, by the compression end, a compressed first Ethernet frame to the decompression end includes: sending, by the compression end, the compressed first Ethernet frame to the decompression end by using a second PDCP data PDU.

Optionally, in the first aspect or various implementations of the first aspect, the second PDCP data PDU includes a second EHC header, and the second EHC header further includes check information.

Optionally, in the first aspect or various implementations of the first aspect, the check information is generated based on one or more pieces of information in the first correspondence.

Optionally, in the first aspect or various implementations of the first aspect, when the compression end receives an error report returned by the decompression end based on the check information, the compression end deletes the first correspondence, or the compression end sets the first correspondence to being unavailable.

Optionally, in the first aspect or various implementations of the first aspect, the compression end is a terminal, the decompression end is a network device, and the method further includes:
  sending, by the compression end, capability information to the decompression end, where the capability information includes at least one of the following: a capability of the compression end supporting EHC, a quantity of data radio bearers DRBs supporting the EHC at the compression end, profile information supported by the compression end, a maximum value MAX_CID of a quantity of correspondences supported by each DRB supporting the EHC, a capability of the compression end supporting of dynamic configuration of a profile parameter, and a sum of quantities of correspondences maintained by DRBs supporting the EHC at the compression end.

Optionally, in the first aspect or various implementations of the first aspect, the compression end is a terminal, and the method further includes: receiving, by the terminal, configuration information, where the configuration information is used to indicate whether an EHC header carries a profile ID, or the configuration information includes a profile ID.

Optionally, in the first aspect or various implementations of the first aspect, the method further includes: receiving, by the compression end, capability information, where the capability information includes at least one of the following:

a capability of the compression end supporting EHC, a quantity of data radio bearers DRBs supporting the EHC at the compression end, profile information supported by the compression end, a maximum value MAX_CID of a quantity of correspondences supported by each DRB supporting the EHC, a capability of the compression end supporting dynamic configuration of a profile parameter, and a sum of quantities of correspondences maintained by DRBs supporting the EHC at the compression end.

Optionally, in the first aspect or various implementations of the first aspect, the decompression end is a terminal, the compression end is a network device, and the method further includes: sending, by the network device, configuration information to the decompression end, where the configuration information is used to indicate whether an EHC header carries a profile ID, or the configuration information includes a profile ID.

According to a second aspect, an Ethernet header decompression method is provided, including: receiving, by a decompression end, a first Ethernet frame, where the first Ethernet frame includes a first context identifier CID; determining, by the decompression end based on the first CID, a first correspondence including the first CID, where the first correspondence includes a correspondence between first compression information and a value of a first to-be-decompressed field, and the first compression information includes the first CID; and decompressing, by the decompression end, an Ethernet header of the first Ethernet frame based on the first compression information and the value of the first to-be-decompressed field in the first correspondence.

In addition, a decompression apparatus is provided, including a unit or a means (means) configured to perform each step in the foregoing second aspect.

In addition, a decompression apparatus is provided, including a processor and an interface circuit. The processor is configured to: communicate with another apparatus through the interface circuit, and perform the method provided in the second aspect. There are one or more processors.

In addition, a decompression apparatus is provided, including a processor, configured to invoke a program stored in a memory, to perform the method provided in the second aspect. The memory is located inside the apparatus, or is located outside the apparatus. In addition, there are one or more processors.

In addition, a computer program is provided. When the program is invoked by a processor, the method provided in the second aspect is performed.

In addition, a computer-readable storage medium is provided, including the foregoing program.

When receiving a compressed first Ethernet frame, the decompression end determines the first correspondence based on the first CID in the first Ethernet frame, and decompress the Ethernet header of the compressed Ethernet frame based on the first correspondence. In this embodiment of this application, because the Ethernet header of the Ethernet frame is compressed, communication resources is saved.

Optionally, in the second aspect or various implementations of the second aspect, the method further includes: receiving, by the decompression end, the first correspondence from a compression end.

Optionally, in the second aspect or various implementations of the second aspect, the receiving, by the decompression end, the first correspondence from a compression end includes: receiving, by the decompression end, an uncompressed data packet, where the uncompressed data packet includes the first correspondence.

Optionally, in the second aspect or various implementations of the second aspect, the receiving, by the decompression end, the first correspondence from a compression end includes: receiving, by the decompression end, the first correspondence from the compression end by using a PDCP data PDU, where the first PDCP data PDU includes a first Ethernet header compression EHC header, the first EHC header includes a first indication field, the first CID, and an Ethernet header of a second Ethernet frame, a value of a to-be-compressed field in the Ethernet header of the second Ethernet frame is equal to the value of the first to-be-compressed field, and the first indication field is used to indicate whether the first EHC header includes a complete Ethernet header.

Optionally, in the second aspect or various implementations of the second aspect, the first EHC header further includes a first profile identifier profile ID.

Optionally, in the second aspect or various implementations of the second aspect, the first indication field is further used to indicate that the first EHC header includes the first profile ID.

Optionally, in the second aspect or various implementations of the second aspect, the first PDCP data PDU further includes a PDCP header, a service data adaptation protocol SDAP header, an Ethernet data payload, and a message authentication code for integrity MAC-I.

Optionally, the receiving, by the decompression end, the first correspondence from a compression end includes: receiving, by the decompression end, the first correspondence from the compression end by using a PDCP control PDU, where the PDCP control PDU includes first indication information, the first CID, and the value of the first to-be-compressed field, and the first indication information is used to indicate that the PDCP control PDU is used to transmit the first correspondence.

Optionally, in the second aspect or various implementations of the second aspect, the PDCP control PDU further includes a first profile ID.

Optionally, in the second aspect or various implementations of the second aspect, the method further includes: receiving, by the decompression end, a first PDCP data PDU from the compression end, where the first PDCP data PDU includes a first EHC header, the first EHC header includes a first indication field and an Ethernet header of a second Ethernet frame, a value of a to-be-compressed field in the Ethernet header of the second Ethernet frame is equal to the value of the first to-be-compressed field, and the first indication field is used to indicate whether the first EHC header carries the first CID.

Optionally, in the second aspect or various implementations of the second aspect, when the first EHC header carries the first CID, the Ethernet header of the second Ethernet frame is a compressed Ethernet header; or when the first EHC header does not carry the first CID, the Ethernet header of the second Ethernet frame is a complete Ethernet header.

Optionally, in the second aspect or various implementations of the second aspect, the first PDCP data PDU further includes a PDCP header, a service data adaptation protocol SDAP header, an Ethernet data payload, and a message authentication code for integrity MAC-I.

Optionally, in the second aspect or various implementations of the second aspect, the decompression end stores a correspondence between at least one piece of compression information and a value of a to-be-decompressed field, and the method further includes: storing, by the decompression end, the first correspondence when the correspondence stored by the decompression end does not include the first compression information; or modifying, by the decompression end, a value of a to-be-decompressed field corresponding to the first compression information to the value of the first to-be-decompressed field when the correspondence stored by the decompression end includes the first compression information, and the value of the to-be-decompressed field corresponding to the first compression information is different from the value of the first to-be-decompressed field.

Optionally, in the second aspect or various implementations of the second aspect, the method further includes: sending, by the decompression end, feedback information to the compression end, where the feedback information is used to indicate a receiving status of the first correspondence.

Optionally, in the second aspect or various implementations of the second aspect, the feedback information includes the first CID.

Optionally, in the second aspect or various implementations of the second aspect, the feedback information further includes at least one of the following: a profile ID, a first indication field, and a second indication field, the first indication field is used to indicate that the first correspondence is a newly added correspondence or a modified correspondence at the decompression end, and the second indication field is used to indicate that the feedback information is a positive feedback or a negative feedback.

Optionally, in the second aspect or various implementations of the second aspect, the first Ethernet frame further includes first check information.

Optionally, in the second aspect or various implementations of the second aspect, the first check information is generated based on one or more pieces of information in the first correspondence.

Optionally, the method further includes: generating, by the compression end, second check information based on the one or more pieces of information in the first correspondence; and decompressing, by the decompression end, the Ethernet header of the first Ethernet frame when the first check information is the same as the second check information; or deleting, by the decompression end, the first correspondence, and/or sending, by the decompression end, an error report to the compression end when the first check information is different from the second check information.

In conclusion, the embodiments of this application provide the Ethernet header compression method and apparatus and the Ethernet header decompression method and apparatus. After receiving the first Ethernet frame including the first to-be-compressed field, the compression end compresses the Ethernet header of first the Ethernet frame based on the first correspondence including the first compression information and the value of the first to-be-compressed field and the first compression information. Correspondingly, the decompression end decompresses the Ethernet header of the compressed first Ethernet frame based on the first correspondence when receiving the compressed first Ethernet frame. In the embodiments of this application, because the Ethernet header of the Ethernet frame is compressed, communication resources is saved.

DESCRIPTION OF EMBODIMENTS

Figure 1:
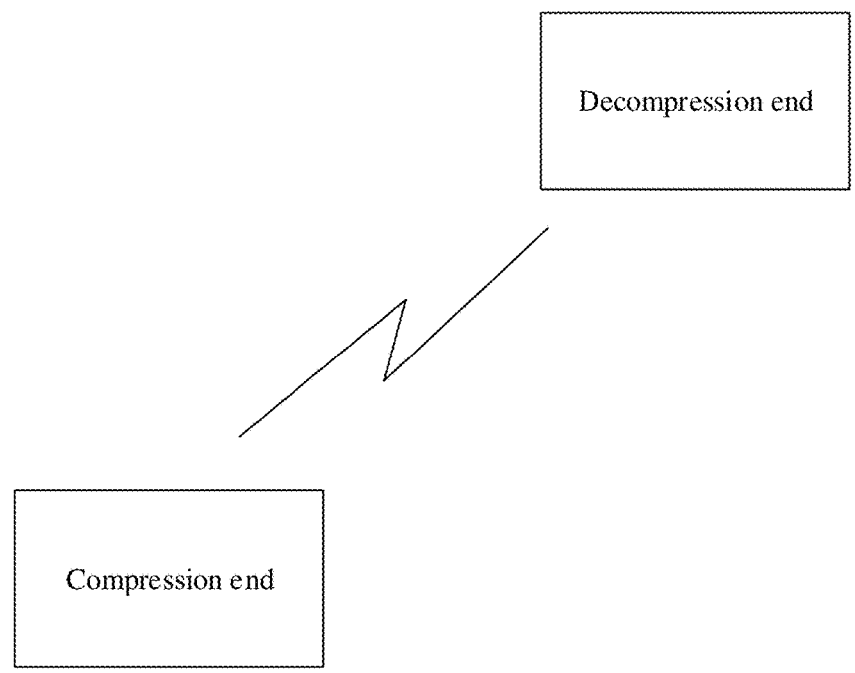
FIG. 1 is a schematic diagram of a network architecture according to an embodiment of this application.

Embodiments of this application provide an Ethernet header compression method and apparatus and an Ethernet header decompression method and apparatus. FIG. 1 is a schematic diagram of a network architecture applicable to embodiments of this application. As shown in FIG. 1, the network architecture includes a compression end and a decompression end.

The compression end is a terminal or an execution unit in the terminal. For example, the execution unit in the terminal is a packet data convergence protocol (PDCP) entity, a radio link control (RLC) entity, a service data adaptation protocol (SDAP) entity, or the like in the terminal, or an Ethernet header compression (EHC) processing module in an entity. Alternatively, the compression end is a network device, or an execution unit in the network device. For example, the execution unit in the network device is a PDCP entity, an RLC entity, an SDAP entity, or the like in the network device, or an EHC processing module in an entity.

The decompression end is a terminal, or an execution unit in the terminal. For example, the execution unit in the terminal is a PDCP entity, an RLC entity, an SDAP entity, or the like in the terminal, or an EHC processing module in an entity. Alternatively, the decompression end is a network device, or an execution unit in the network device. For example, the execution unit in the network device is a PDCP entity, an RLC entity, an SDAP entity, or the like in the network device, or an EHC processing module in an entity.

For example, in an application scenario of compressing and decompressing an uplink data stream, the compression end is a terminal, a PDCP entity, an RLC entity, an SDAP entity, or the like in the terminal, or an EHC processing module in an entity. The decompression end is a network device, a PDCP entity, an RLC entity, an SDAP entity, or the like in the network device, or an EHC processing module in an entity. In an application scenario of compressing and decompressing a downlink data stream, the compression end is a network device, a PDCP entity, an RLC entity, an SDAP entity, or the like in the network device, or an EHC processing module in an entity. The decompression end is a terminal, a PDCP entity, an RLC entity, an SDAP entity, or the like in the terminal, or an EHC processing module in an entity. In an application scenario of sidelink (sidelink) communication between two terminals, both the compression end and the decompression end are terminals, PDCP entities, RLC entities, SDAP entities, or the like in the terminals, or EHC processing modules in entities that perform sidelink communication.

During application, in an industrial control scenario, for example, in an industrial Internet of things (IIoT) scenario, most industrial control data has a time sensitive (TS) characteristic, and an industrial control node needs to generate data at a determined time point and needs to transmit the data to a peer node at a time interval. To support transmission of industrial control data, an Ethernet technology is used for most industrial control networks during deployment.

Figure 2:
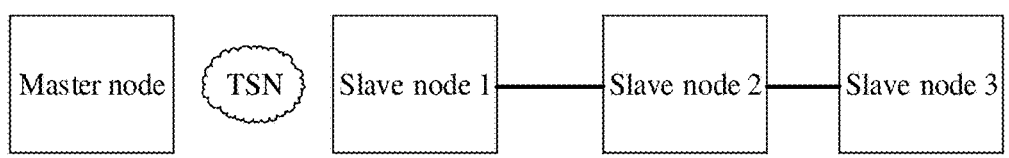
FIG. 2 is a schematic diagram of a control system according to an embodiment of this application.

A conventional ether control automation technology (etherCAT) system includes a master node (master) and at least one slave node (slave). With the evolution of the etherCAT, a wired time sensitive network (TSN) is used to implement transmission between the master and the slave, as shown in FIG. 2. The TSN is used to ensure that a transmission latency between the master and the slave fluctuates within a small range, to achieve an effect similar to that of using a dedicated cable connection between the master and the slave. In this way, the master and the slave is physically flexibly connected. The master node further is referred to as a controller (controller), and the slave node further is referred to as an end device (end device).

Figure 3:
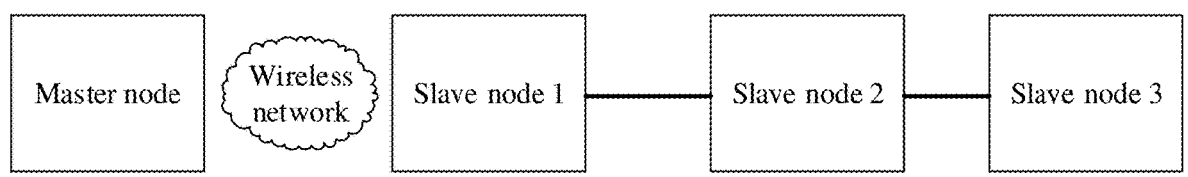
FIG. 3 is a schematic diagram of another control system according to an embodiment of this application.
Figure 4:
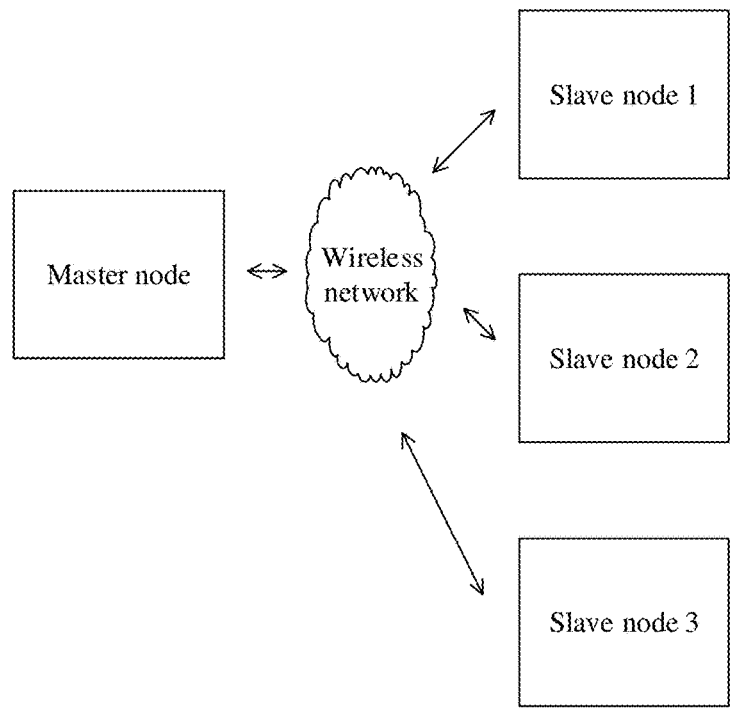
FIG. 4 is a schematic diagram of still another control system according to an embodiment of this application.

With the evolution of wireless technologies, an expectation is that a wireless network is used to implement transmission between the master and the slave. As shown in FIG. 3, a wireless network is used to implement transmission between a master and a slave 1, and the wireless network is used to ensure that a transmission latency between the master and the slave 1 fluctuates within a small range, to achieve an effect similar to that of using a dedicated cable connection between the master and the slave 1. The slave 1 is a slave in a slave group, and communicates with the master through the wireless network. Remaining slaves establish wired connections to the slave 1. The slave group further is referred to as a slave chain. Therefore, a more flexible physical connection is implemented between the master and the slave. Alternatively, a wired connection between slaves are eliminated, and wireless transmission is used to entirely replace wired transmission, to implement fully flexible deployment. As shown in FIG. 4, a master communicates with each slave through a wireless network.

Figure 5:
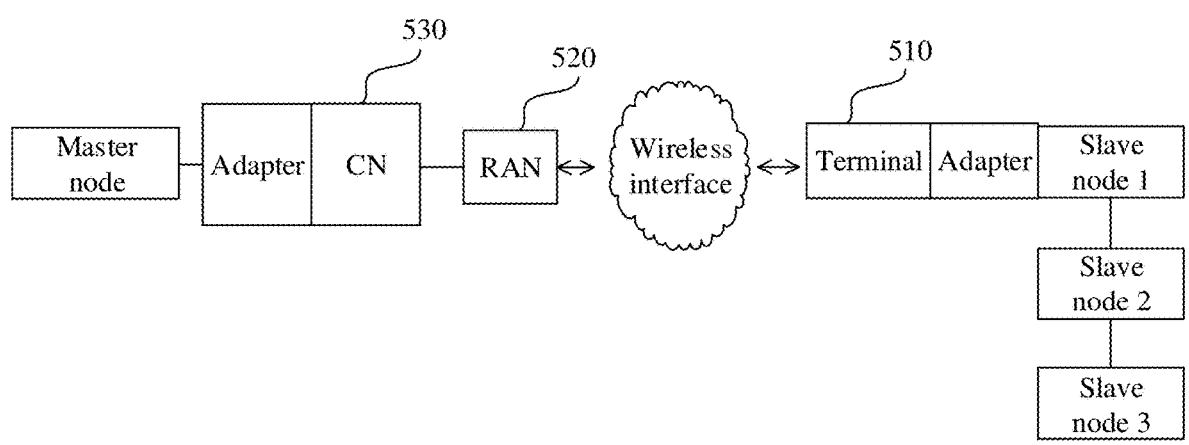
FIG. 5 is a schematic diagram in which a wireless communication network is applied to a control network according to an embodiment of this application.

An implementation is that shown in FIG. 5. A terminal 510 accesses a wireless network through a wireless interface (for example, an air interface), to communicate with another device, such as a master, through the wireless network. The wireless network includes a radio access network (RAN) 520 and a core network (CN) 530. The RAN 520 is configured to connect the terminal 510 to the wireless network, and the CN 530 is configured to: manage the terminal and provide a gateway for communicating with another device. The terminal is a device having a wireless communication function. The terminal is connected to a slave in the foregoing control system through an adapter, to receive, through the wireless network, data sent by the master to the slave and send the data to the slave, or send, to the master through the wireless network, data sent by the slave to the master. The terminal and the slave is integrated on a physical entity, for example, the slave 1 in FIG. 3 or a slave in FIG. 4 is integrated with an element (for example, a chip) having a wireless communication function. In this case, the slave is integrated with the wireless communication function and an instruction-based operation function of the terminal in industrial control.

In the foregoing control network, a wireless network is used to replace an interface between a master and a slave, and a wired interface is still used between slaves. In another control network, a wireless network is further used to replace an interface between a master and a slave, and each slave communicates with the master through the wireless network. In the structure shown in FIG. 4, each slave is connected to a terminal through an adapter, or each slave is integrated with an element (for example, a chip) having a wireless communication function, to access the wireless network through a wireless interface. In still another control network, the foregoing two connection manners are combined. Some slaves communicate with a master through a wireless network, and the other slaves establish wired connections to the slaves that are wirelessly connected to the master. For example, slaves are grouped, and each group has one slave, for example, a slave 1. The slave 1 communicates with the master through the wireless network. A remaining slave establishes a wired connection to the slave 1. The slave group further is referred to as a slave chain. The slave 1 is an ingress and an egress of the slave group connected to the wireless network, that is, a slave connected to a terminal apparatus. For another example, slaves are grouped, and each group has two slaves, for example, a slave 1 and a slave n. The slave 1 and the slave n communicate with a master through a wireless network, and a remaining slave establishes a wired connection to the slave 1 and the slave n. The slave group further is referred to as a slave chain. The slave 1 and the slave n are respectively an ingress and an egress of the slave group connected to the wireless network, that is, slaves connected to a terminal apparatus.

In the embodiments of this application, the terminal is further referred to as a terminal apparatus or user equipment (UE), is an apparatus having a wireless communication function, and is connected to a slave. In the following embodiments, the terminal is referred to as a terminal apparatus. The terminal apparatus is independent of the slave, or is integrated with the slave. When the terminal apparatus is integrated with the slave, the terminal apparatus is an apparatus integrated with a slave physical entity and a wireless communication function, for example, a chip or a system-on-a-chip. The terminal apparatus includes a wireless terminal in industrial control (industrial control), or is a terminal having a similar use in another control system, for example, a wireless terminal in self driving (self driving), a wireless terminal in remote medical surgery (remote medical surgery), a wireless terminal in smart grid (smart grid), a wireless terminal in transportation safety (transportation safety), a wireless terminal in a smart city (smart city), or a wireless terminal in a smart home (smart home).

The network device is a device in a wireless network, for example, a radio access network (RAN) node or a base station that connects a terminal apparatus to the wireless network. Currently, examples of some RAN nodes or base stations are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB) a baseband unit (BBU), a relay station, a wireless fidelity (Wi-Fi) access point (AP), a radio controller in a cloud radio access network (CRAN) scenario, a road site unit (RSU) in vehicle to everything (V2X), or an access point in an integrated access backhaul (IAB) system. A RAN device further is integrated with a function of a TSN network node. For example, if a function of a console is integrated, the network device alternatively is the console. In a network structure, the network device includes a centralized unit (CU) node, a distributed unit (DU) node, or a RAN device including a CU node and a DU node.

In a network architecture, a RAN includes a baseband apparatus and a radio frequency apparatus. The baseband apparatus is implemented by one node, or is implemented by a plurality of nodes. The radio frequency apparatus is independently implemented remotely from the baseband apparatus, or is integrated into the baseband apparatus, or a part of the radio frequency apparatus is implemented remotely from the baseband apparatus and the other part is integrated into the baseband apparatus. For example, a RAN includes a baseband apparatus and a radio frequency apparatus. The radio frequency apparatus is remotely disposed relative to the baseband apparatus. For example, a remote radio unit (RRU) is remotely disposed relative to a BBU.

Communication between the RAN and the terminal follows a protocol layer structure. For example, a control plane protocol layer structure includes functions of protocol layers such as a radio resource control (RRC) layer, a packet data convergence protocol (PDCP) layer, a radio link control (RLC) layer, a media access control (MAC) layer, and a physical layer. A user plane protocol layer structure includes functions of protocol layers such as a PDCP layer, an RLC layer, a MAC layer, and a physical layer. In an implementation, a service data adaptation protocol (SDAP) layer is further included above the PDCP layer. The functions of these protocol layers are implemented by one node, or is implemented by a plurality of nodes. For example, in an evolved structure, a RAN includes a centralized unit (CU) and a distributed unit (DU). A plurality of DUs are centrally controlled by one CU. The CU and the DU is obtained through division based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU. Division based on the protocol layer is merely an example, and division alternatively is performed based on another protocol layer. For example, division is performed based on the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division alternatively is performed in another manner. For example, division is performed based on a latency. A function whose processing time needs to meet a latency parameter is set on the DU, and a function whose processing time does not need to meet the latency parameter is set on the CU.

Optionally, the radio frequency apparatus is not placed in the DU but is placed remotely from the DU, or is integrated into the DU, or a part of the radio frequency apparatuses is placed remotely from the DU and the other part is integrated into the DU. This is not limited herein.

Optionally, a control plane (CP) and a user plane (UP) of the CU is further separated, and implemented by different entities, which are respectively a control plane CU entity (CU-CP entity) and a user plane CU entity (CU-UP entity).

In the foregoing network architecture, signaling generated by the CU is sent to a terminal by using the DU, or signaling generated by a terminal is sent to the CU by using the DU. The DU transparently transmits the signaling to the terminal or the CU by directly encapsulating the signaling at a protocol layer without parsing the signaling. In the following embodiments, if transmission of such signaling between the DU and the terminal is included, that the DU sends or receives the signaling includes this scenario. For example, signaling at an RRC layer or a PDCP layer is finally processed as signaling at a PHY layer and sent to the terminal, or is converted from received signaling at a PHY layer. In this architecture, further is a consideration is the signaling at the RRC layer or the PDCP layer is sent by the DU, or sent by the DU and a radio frequency apparatus.

When the foregoing CU-DU structure is used, a network device is a CU node, a DU node, or a RAN device including a CU node and a DU node.

Figure 6:
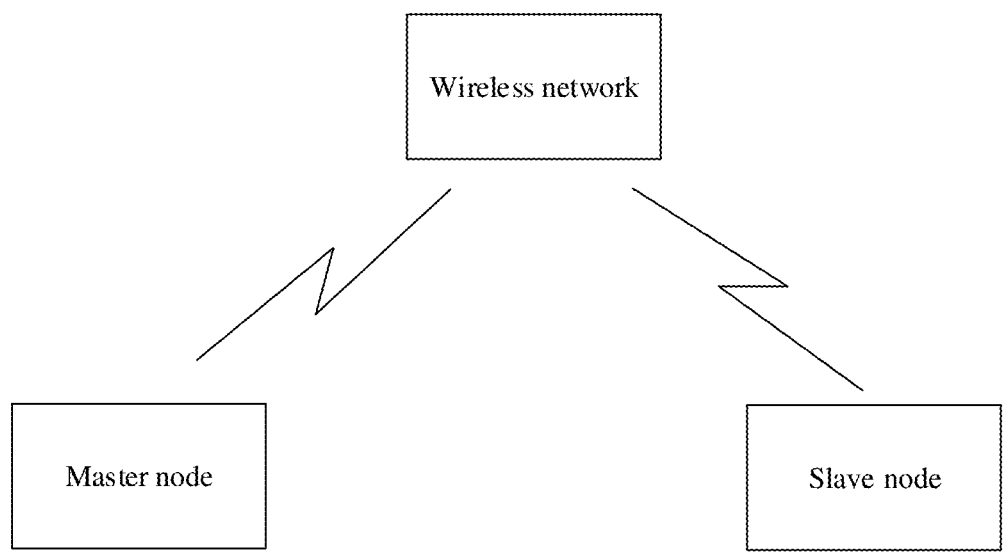
FIG. 6 is a schematic diagram of another network architecture according to an embodiment of this application.

Learned from the foregoing descriptions is that replacing a wired network with a wireless network is used as a last hop of an industrial control network, this reduces costs, facilitate maintenance, and support flexible deployment and mobility of a slave node compared with the wired network. As shown in FIG. 6, a master node transmits an Ethernet frame to a slave node through a wireless network, the slave node receives the Ethernet frame through the wireless network and sends an Ethernet frame to the master node through the wireless network. Therefore, the Ethernet frame needs to be transmitted in the wireless network. The Ethernet frame includes a header and a payload, and transmission of the Ethernet frame in the wireless network uses high resource overheads. In the embodiments of this application, overheads of transmitting the Ethernet frame in the wireless network are expected to be reduced, to improve resource utilization.

In the embodiments of this application, information transmitted in the wireless network is reduced through Ethernet header compression, thereby reducing resource overheads and improving resource utilization.

The following further describes a compression and decompression method in the embodiments of this application with reference to the accompanying drawings. Apparatuses in the following embodiments of this application is located in different devices based on functions implemented by the apparatuses.

Figure 7:
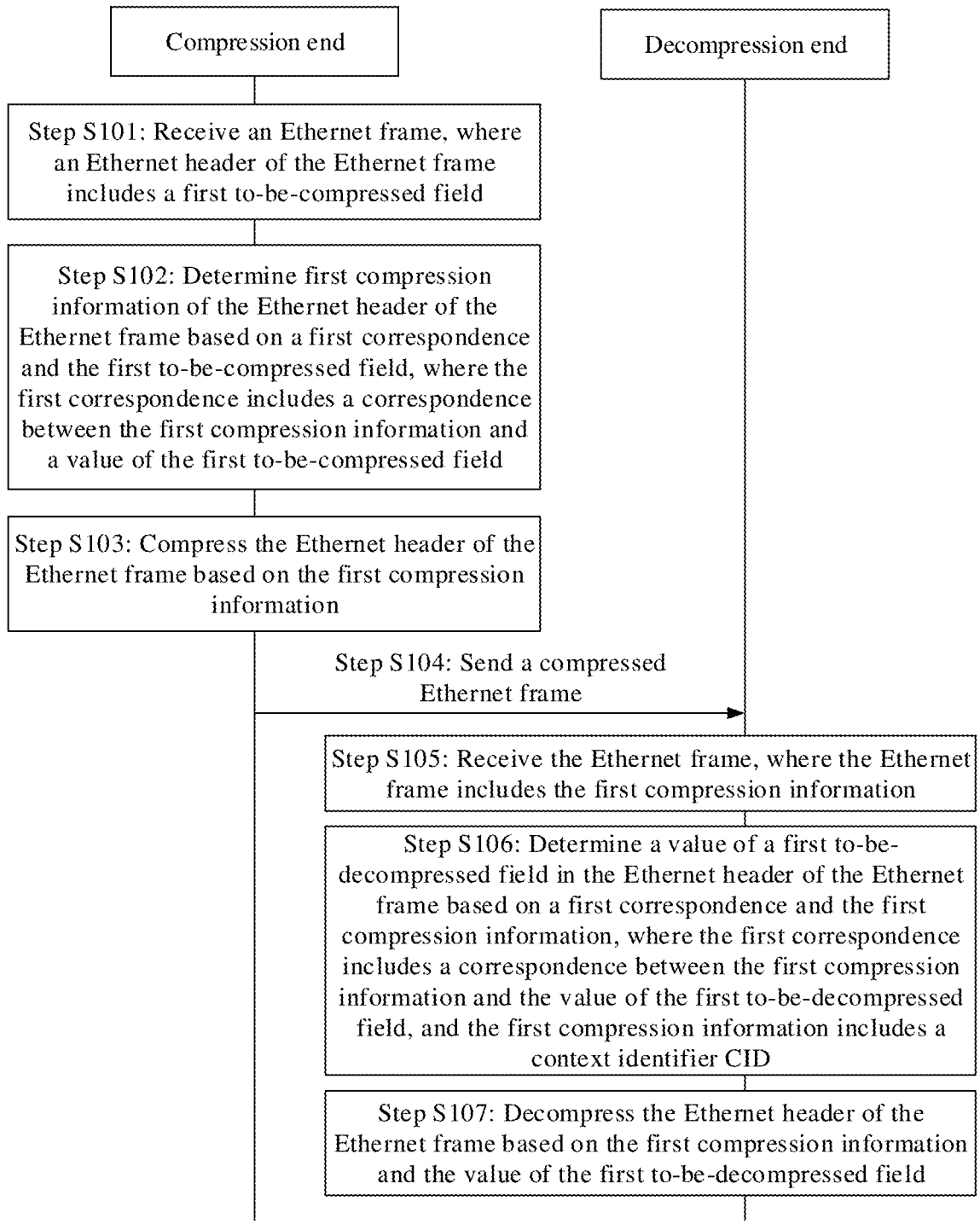
FIG. 7 is a schematic flowchart of a compression and decompression method according to an embodiment of this application.

FIG. 7 is a schematic flowchart of an Ethernet header compression and decompression method according to an embodiment of this application. During actual application, a compression process of a compression end and a decompression process of a decompression end is independently implemented. In an example, after completing the compression process, the compression end sends a compressed Ethernet frame to the decompression end at any time thereafter, and the decompression end receives the compressed Ethernet frame at any time and decompress the compressed Ethernet frame. This is not limited in this embodiment of this application. As shown in FIG. 7, the method provided in this embodiment of this application includes the following steps.

Step S101: The compression end receives an Ethernet frame, where an Ethernet header of the Ethernet frame includes a first to-be-compressed field.

Figure 8:
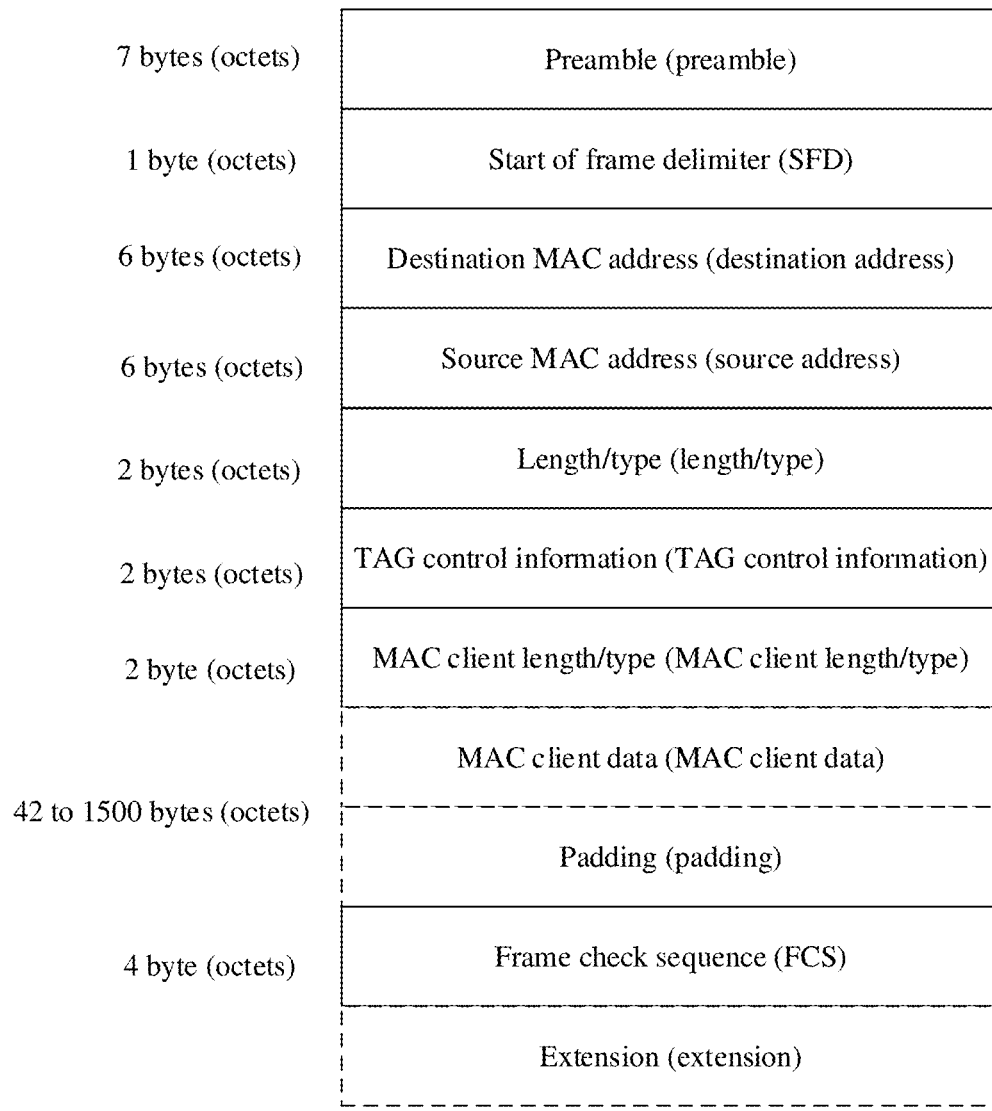
FIG. 8 is a schematic diagram of a format of an Ethernet frame according to an embodiment of this application.

In this embodiment of this application, the compression end receives an Ethernet frame from a master node, or receive an Ethernet frame from a slave node. The Ethernet frame includes an Ethernet header and a payload, and includes a plurality of fields. For example, FIG. 8 shows an 802.1Q Ethernet MAC frame format set in the IEEE 802.3. In the Ethernet frame format, the Ethernet frame includes the following fields: a 7-byte preamble (preamble), a 1-byte start of frame delimiter (SFD), a 6-byte destination media access control (MAC) address, a 6-byte source MAC address, a 2-byte length/type (for example, 802.1QTagType), 2-byte tag control information (TAG control information or tagging control information), a 2-byte MAC client length/type, a variable length load or payload, and a 4-byte frame check sequence (FCS). The payload includes data (for example, MAC client data), and optionally, the payload further includes a padding (padding) field. Fields before the payload are the Ethernet header, and the subsequent FCS is used for check of the Ethernet frame. The foregoing Ethernet format is merely an example, and is not intended to limit this application. In different Ethernet frame structures, formats are different. For example, the Ethernet header includes a destination MAC address, a source MAC address, and a length/type field. Other fields are partially or all included in an Ethernet frame. In addition, sizes of the foregoing fields are merely an example, and are not used to limit this application. The preamble is used to identify and detect that an Ethernet frame is transmitted on an Ethernet transmission link on a receiving side of the Ethernet frame. The SFD is used to determine a start position of subsequent Ethernet frame content on the receiving side of the Ethernet frame. The destination MAC address is a MAC address on the receiving side. The source MAC address is a MAC address of a sender. The length/type is used to identify a tag protocol. The tag control information is used to indicate tag-related information. The MAC client length/type is used to indicate a valid data length of the Ethernet frame or an Ethernet type of a MAC client protocol.

For example, in the Ethernet frame format shown in FIG. 8, in the Ethernet header of the compressed Ethernet frame, the first to-be-compressed field includes a destination MAC address, a source MAC address, a length/type field, TAG control information, or a MAC client length/type. In addition, any one, two or more fields, or all of these fields are compressed. The first to-be-compressed field further includes two or more of the foregoing fields. For example, the first to-be-compressed field includes the destination MAC address and the source MAC address. That is, the MAC addresses in the Ethernet header are compressed. This compression manner is applicable to Ethernet header compression in a scenario in which another field changes greatly but the MAC address field is static. Alternatively, the first to-be-compressed field includes the destination MAC address, the TAG control information, and the MAC client length/type. Fields included in the first to-be-compressed field in Ethernet headers in different formats are different. Table 1 shows fields included in a frame format of an Ethernet II type. The first to-be-compressed field includes any one or two, or all of the following fields: the destination MAC address field, the source MAC address field, and the type field.

TABLE 1

| 6 bytes | 6 bytes | 2 bytes | 46 to 1500 bytes | 4 bytes |
|---|---|---|---|---|
| Destination MAC address | Source MAC address | Type | Data | FCS |

Step S102: The compression end determines first compression information of the Ethernet header of the Ethernet frame based on a first correspondence and the first to-be-compressed field, where the first correspondence includes a correspondence between the first compression information and a value of the first to-be-compressed field.

In this embodiment of this application, the compression end stores a correspondence between compression information and a value of a to-be-compressed field, where the first correspondence is the correspondence between the first compression information and the value of the first to-be-compressed field. A correspondence stored by the compression end includes the first correspondence, that is, the first correspondence is prestored at the compression end. Alternatively, a correspondence stored by the compression end is excluded the first correspondence. In this case, the first correspondence further is generated by the compression end in real time or based on a parameter in a data stream transmission process. A manner of obtaining the first correspondence is not limited in this embodiment of this application. A method used by the compression end to generate the first correspondence is determined based on an actual application scenario. The method for generating the first correspondence is further described in subsequent embodiments. Details are not described herein in this embodiment of this application.

The compression end determines the first compression information included in the first correspondence as the first compression information of the Ethernet header of the Ethernet frame. Each of correspondences are associated with an identifier of the correspondence, and the compression information includes the identifier of the correspondence (or referred to as an identifier of the compression information). In this case, the first compression information includes an identifier of the first correspondence or an identifier of the first compression information. In the following embodiments, an example in which the information is a context identifier (CID) is used.

Optionally, the compression information further includes a profile identifier (profile ID), so that the first compression information further includes a first profile ID. The profile ID is used to identify a profile (profile). The profile is used to specify a compression mechanism, for example, the profile is used to indicate a compressible field and/or a compression manner. Different profiles are distinguished by using profile IDs. Alternatively, the profile ID is used to indicate a communication protocol of the Ethernet header and/or a to-be-compressed field of the Ethernet header. For example, profile ID=1 indicates that the destination MAC address+source MAC address fields in the IEEE 802.3 Ethernet frame format are compressed; profile ID=2 indicates that the destination MAC address+source MAC address+TAG control information fields in the IEEE 802.3 Ethernet frame format are compressed; profile ID=3 indicates that the destination MAC address+source MAC address+length/type fields in the Ethernet 2 Ethernet frame format are compressed, and the like. The foregoing provides an example of a to-be-compressed field directed by the profile in the Ethernet protocol. Optionally, a transport layer protocol is introduced. In this way, the compression end and the decompression end is configured to use different profile IDs to distinguish between the transmission control protocol/internet protocol (TCP/IP) and the User Datagram Protocol/Internet Protocol (UDP/IP).

Optionally, the compression information is excluded a profile ID. For example, when the compression end and the decompression end compress the Ethernet header based on a profile, the compression end and the decompression end determines the profile as a default profile, and perform compression or decompression based on the profile when performing compression or decompression. In this case, the compression information is excluded the profile ID. In this case, the compression information alternatively includes the profile ID, to facilitate subsequent extension. Optionally, the compression end further stores an indication variable of each correspondence, and the indication variable is used to indicate whether compression information of the correspondence is used for compression.

In an implementation, the compression end stores context information, where the context information includes at least one context entry (entry). The context information is as follows:

Entry 1: CID 1, profile 1, a compressed-field value A1, and an availability indication;

Entry 2: CID 2, profile 2, compressed-field value A2, and an availability indication;

. . .

Entry N: CID 3, profile N, compressed-field value AN, and an availability indication.

N is a positive integer, that is, the context information includes the at least one context entry. Each context entry includes a CID and a compressed-field value, that is, each correspondence described above. In addition, each context entry further includes an indication variable, referred to as an availability indication herein, used to indicate whether compression information in a context entry in which the indication variable (or compression information) is located is used for compression. The first correspondence is included in one context entry (for example, a first entry). If the compression end does not store the first entry, the compression end generates the first entry into the stored context information. Each of correspondences are associated with an identifier of the correspondence, and the identifier of the correspondence is referred to as a context identifier (CID), that is, each context entry is associated with one CID. In this case, the compression information includes the CID, the first compression information includes a first CID, and the first CID further is used as an identifier of the first correspondence. Optionally, each context entry includes a profile ID. In this case, the compression information includes the profile ID, and the first compression information includes a first profile ID. If the profile ID is not included, a default profile is used for compression. In addition, profile IDs included in different context entries are the same. For example, both the entry 1 and the entry 2 is configured to use the profile 1.

Step S103: The compression end compresses the Ethernet header of the Ethernet frame based on the first compression information.

In this embodiment of this application, the compression end compresses the Ethernet header of the Ethernet frame based on the first compression information. If the first compression information includes the profile ID, a profile is determined based on the profile ID, and the first to-be-compressed field is found based on a compressed field directed by the profile. If the first correspondence does not include the profile ID, the first to-be-compressed field is found based on a compressed field directed by the default profile. The first to-be-compressed field is one or more fields in the Ethernet header, and a field or fields that is/are included is determined based on the profile. When the first to-be-decompressed field is one field in the Ethernet header, a value of the first to-be-compressed field in the first correspondence is the field. When the first to-be-decompressed field is a plurality of fields in the Ethernet frame header, a value of the first to-be-compressed field in the first correspondence is a combination of values of the plurality of fields. For example, the compression end deletes the first to-be-compressed field in the Ethernet header, and add the corresponding first CID to a data packet. During actual application, the Ethernet header of the Ethernet frame alternatively is compressed based on the first compression information in another manner based on an actual application scenario. This is not specifically limited in this embodiment of this application.

Correspondingly, after compressing the Ethernet header of the Ethernet frame, the compression end further sends the compressed Ethernet frame to the decompression end. The decompression end decompresses the compressed Ethernet frame based on the correspondence between the first compression information and the value of the first to-be-compressed field. For details, refer to the descriptions in steps S104 to S107.

Step S104: The compression end sends the compressed Ethernet frame to the decompression end.

In this embodiment of this application, the compression end selects an appropriate manner based on an actual application scenario, to send the compressed Ethernet frame to the decompression end. That the compression end sends the compressed Ethernet frame to the decompression end is not specifically limited in this embodiment of this application.

In this embodiment of this application, the compressed Ethernet frame includes the first compression information. Specifically, the first compression information includes the first CID, so that the decompression end further decompresses the compressed Ethernet frame based on the first CID.

In an optional implementation, the compression end sends the compressed Ethernet frame to the decompression end by using a packet data convergence protocol control protocol data unit (PDCP data PDU).

Figure 9:
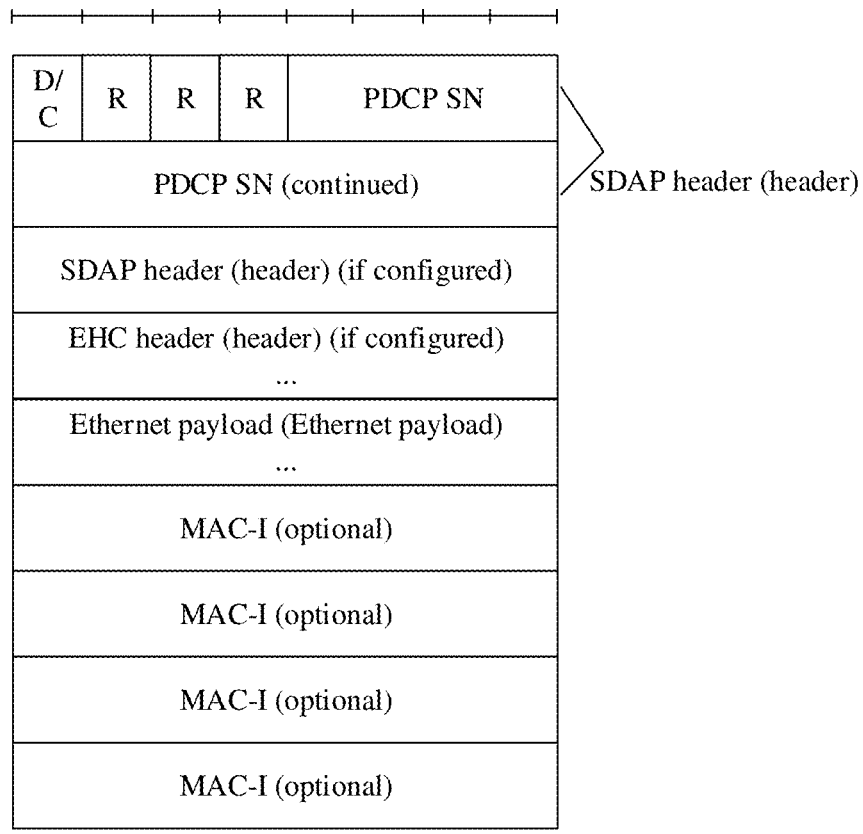
FIG. 9 shows a format of a PDCP data PDU configured with an EHC header according to an embodiment of this application.

In this embodiment of this application, an EHC header is configured in a format of the PDCP data PDU. For example, FIG. 9 shows a format of a PDCP data PDU configured with an EHC header according to an embodiment of this application. The format of the PDCP data PDU includes a PDCP header, a service data adaptation protocol (SDAP) header, the EHC header, an Ethernet data payload (Ethernet data payload), and a message authentication code for integrity (MAC-I), where the PDCP header includes a PDCP serial number (SN), and PDCP SNs are set in different rows. In the figure, "if configured" indicates that this field is optional, that is, this field is configured, or is unable to be configured.

FIG. 9 shows one manner of locations of the PDCP header, the SDAP header, the EHC header, the Ethernet data payload, and the MAC-I. During actual application, locations, specific byte lengths, and included content of the PDCP header, the SDAP header, the EHC header, the Ethernet data payload, and the MAC-I is adaptively set based on an actual application scenario. This is not specifically limited in this embodiment of this application. For example, a length of the PDCP SN is 12 bits or 18 bits. For example, the SDAP header is located between the EHC header and the Ethernet data payload, the SDAP header is located between the Ethernet data payload and the MAC-I, or the SDAP header is located after the MAC-I.

Figure 10:
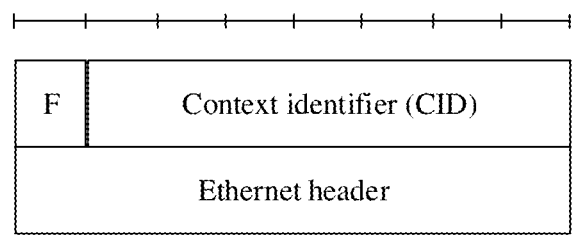
FIG. 10 is a schematic diagram of a format of a first EHC header according to an embodiment of this application.

In this embodiment of this application, the EHC header includes an indication field F, a CID, and the Ethernet header. The indication field F is used to indicate whether the EHC header includes a complete or compressed Ethernet header, or is used to indicate whether the Ethernet header is compressed. For example, FIG. 10 shows a format of an EHC header according to an embodiment of this application. A length of the indication field F is 1 to 3 bits. For example, a length of F is 1 bit, and a value is 1 or 0. The decompression end determines, based on the value of the field F, whether the data packet carries the compressed Ethernet frame. In this step, the compression end sends the compressed Ethernet frame to the decompression end. Therefore, the value of the field F indicates that the EHC header includes the compressed Ethernet header or indicates whether the Ethernet header is compressed. A length value of a context identifier (context ID/CID) field is 2 to 16 bits. For example, a length of the context ID field is 5 bits, 6 bits, 7 bits, 8 bits, or 16 bits. This field indicates an identifier of compression information used for header compression of the Ethernet frame. An Ethernet header field is a part obtained after the first to-be-compressed field is removed from an original Ethernet header. A sequence of the foregoing fields are that the field F is located before the CID field, and the CID field is located before the Ethernet header field; or the CID field is located before the field F, and the field F is located before the Ethernet header field. That is, the sequence of these fields is not limited in this embodiment of this application.

Figure 11:
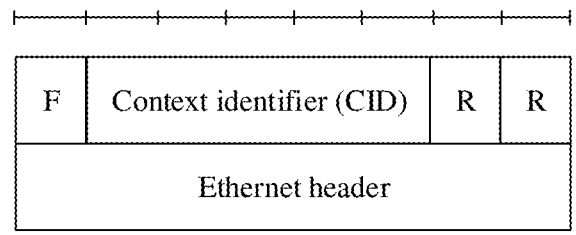
FIG. 11 is a schematic diagram of a format of a second EHC header according to an embodiment of this application.

In an optional implementation of this embodiment of this application, to ensure byte alignment of the EHC, the EHC further includes one or more Reserved® bits, for example, at least one of a location before the field F, a location between the field F and the CID field, and a location between the CID field and the Ethernet header has at least one reserved bit/R bit. For example, as shown in FIG. 11, the length of the field F is 1 bit, the length of the CID field is 5 bits, and two reserved bits are located after the CID field.

In an optional implementation of this embodiment of this application, the EHC header further includes a profile ID, and a location of the profile ID is located between the CID and the Ethernet header. This is not specifically limited in this embodiment of this application. In this case, the foregoing indication field F is further used to indicate whether a first EHC header includes the profile ID. Alternatively, a new indication field is added to the EHC header, to indicate whether a first EHC header includes the profile ID.

Because the correspondence stored by the decompression end includes the profile ID or the default profile is used, in an optional implementation of this embodiment of this application, a further set is that the EHC header of the compressed Ethernet frame does not include the profile ID. Therefore, space occupied by the compressed Ethernet frame is further reduced, and resource occupation is further reduced.

Step S105: The decompression end receives the Ethernet frame, where the Ethernet frame includes an identifier of a first correspondence, that is, a first CID.

Step S106: The decompression end determines, based on the first CID, the first correspondence including the first CID, where the first correspondence includes a correspondence between first compression information and a value of a first to-be-decompressed field, and the first compression information includes the first CID.

In this embodiment of this application, specific content of the first correspondence is the same as specific content of the first correspondence at the compression end. To correspond to a decompression action of the decompression end, a value of a field corresponding to the first compression information in the first correspondence is referred to as the value of the first to-be-decompressed field. The first compression information is the same as that in the foregoing descriptions of the compression end, and further is referred to as first decompression information at the decompression end. Content included in the first compression information is the same as that in the foregoing descriptions of the compression end.

Same as the compression end, the decompression end stores a correspondence between compression information and a value of a to-be-decompressed field, where the first correspondence is the correspondence between the first compression information and the value of the first to-be-decompressed field. A correspondence stored by the decompression end includes the first correspondence, that is, the first correspondence is prestored at the decompression end. Alternatively, a correspondence stored by the decompression end is excluded the first correspondence. In this case, the first correspondence further is received by the decompression end in real time or from the compression end during data stream transmission. A manner of obtaining the first correspondence by the decompression end is not specifically limited in this embodiment of this application. A method used by the decompression end to obtain the first correspondence is determined based on an actual application scenario. The method used by the decompression end to obtain the first correspondence is further described in subsequent Embodiments. Details are not described herein in this embodiment of this application.

The decompression end determines a value of a to-be-decompressed field included in the first correspondence as the value of the first to-be-decompressed field of the Ethernet header of the Ethernet frame. Each of correspondences are associated with an identifier of the correspondence, and the compression information includes the identifier of the correspondence. In this case, the first compression information includes the identifier of the first correspondence.

Optionally, the compression information further includes a profile identifier, so that the first compression information further includes a first profile ID. The profile ID is used to identify a profile. The profile is used to specify a compression mechanism, for example, the profile is used to indicate a compressible field and/or a compression manner. Different profiles are distinguished by using profile IDs. Alternatively, the profile ID is used to indicate a communication protocol of the Ethernet header and/or a to-be-compressed field of the Ethernet header. In addition, same as the compression side, the compression information is excluded a profile ID. For detailed descriptions, refer to the descriptions of the compression side. Details are not described herein again. Optionally, same as the compression end, the decompression end further stores an indication variable of each correspondence, and the indication variable is used to indicate whether compression information of the correspondence is used for compression.

Same as the compression end, the decompression end stores context information, where the context information includes at least one context entry (entry). The descriptions of the context information are the same as those in the foregoing embodiment, and details are not described herein again.

If the decompression end has the same understanding of a compression mechanism as the compression end, "compression" in the descriptions of the decompression end is replaced with "decompression".

Step S107: The decompression end decompresses the Ethernet header of the Ethernet frame based on the first compression information and the value of the first to-be-decompressed field.

In this embodiment of this application, the decompression end decompresses the Ethernet header by using a process opposite to that of the compression end. The decompression end determines, based on the first CID, the first correspondence of the first CID, to find the value of the first to-be-decompressed field. If the first correspondence or the first compression information includes the profile ID, a profile is determined based on the profile ID, and the first to-be-decompressed field is found based on a compressed field directed by the profile. If the first correspondence does not include the profile ID, the first to-be-decompressed field is found based on a compressed field directed by the default profile. The first to-be-decompressed field is one or more fields in the Ethernet header, and a specific field or specific fields that is/are specifically included is determined based on the profile. When the first to-be-decompressed field is one field in the Ethernet header, the value of the first to-be-decompressed field in the first correspondence is filled into the field in the Ethernet header, to decompress the Ethernet header in the to-be-decompressed Ethernet frame. When the first to-be-decompressed field is a plurality of fields in the Ethernet header, the value of the first to-be-decompressed field in the first correspondence is split into values of the plurality of fields based on sizes of the plurality of fields, and the values are respectively filled into the plurality of fields, to decompress the Ethernet header of the to-be-decompressed Ethernet frame. For example, the first to-be-decompressed field includes a plurality of fields in the Ethernet header, for example, includes a destination MAC address, a source MAC address, and a MAC client length/type. After determining a specific value of the first to-be-decompressed field based on the first CID, when recovering an original Ethernet header, the decompression end fills a value of a corresponding field into a corresponding Ethernet header field. For example, the decompression end fills a value of the destination MAC address into a destination MAC address field location, fills a value of the source MAC address into a source MAC address field location, and fills a value of the MAC client length/type into a MAC client length/type field location. During actual application, decompression alternatively is performed based on an actual application scenario by using a decompression manner corresponding to a compression manner of the compression end. This is not specifically limited in this embodiment of this application.

In conclusion, in this embodiment of this application, after receiving the Ethernet frame including the first to-be-compressed field, the compression end compresses the Ethernet header of the Ethernet frame based on the first correspondence including the first compression information and the value of the first to-be-compressed field and the first compression information. Correspondingly, the decompression end decompresses the Ethernet header of the compressed Ethernet frame based on the first correspondence when receiving the compressed Ethernet frame. In this embodiment of this application, because the Ethernet header of the Ethernet frame is compressed, communication resources is saved.

Figure 12:
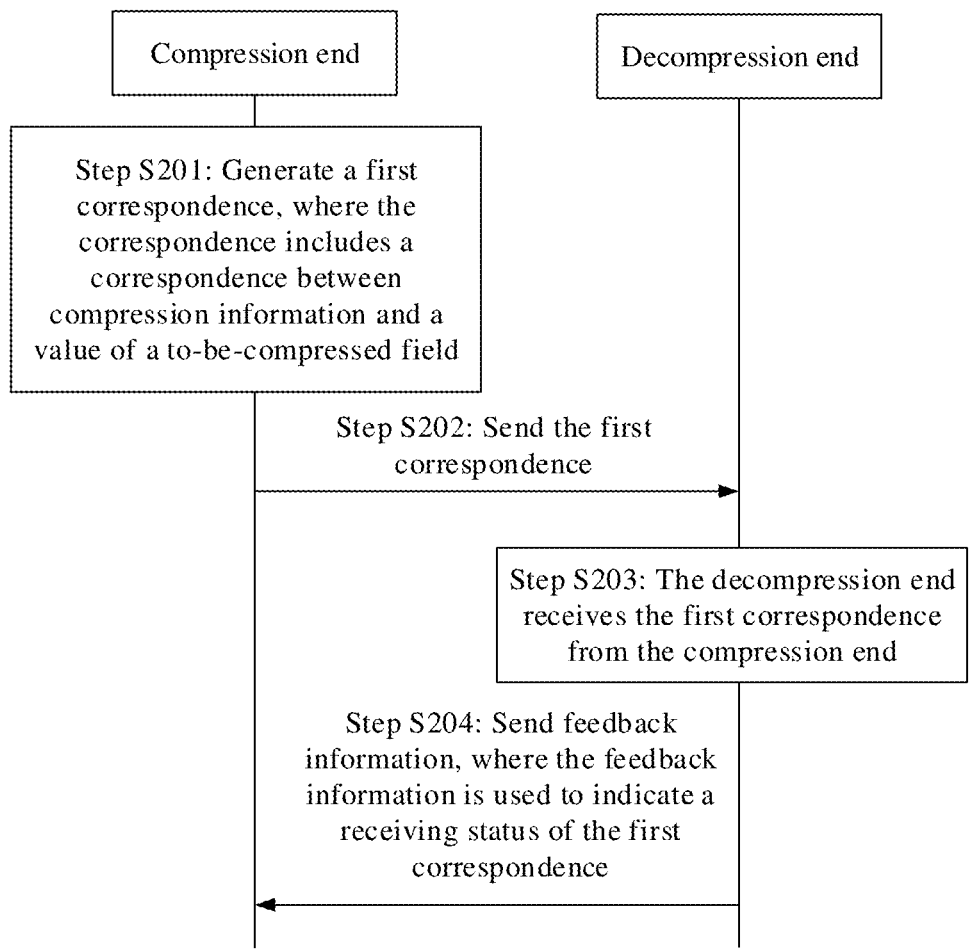
FIG. 12 is a schematic flowchart of a method for synchronizing a first correspondence between a compression end and a decompression end according to an embodiment of this application.

The first correspondence in this embodiment of this application is generated by the compression end, and is synchronized with the decompression end. After the decompression end completes synchronization of the first correspondence, the decompression end and the compression end performs corresponding compression and decompression operations based on the first correspondence. FIG. 12 is a schematic flowchart of a method for synchronizing a first correspondence between a compression end and a decompression end according to an embodiment of this application. As shown in FIG. 12, the method provided in this embodiment of this application includes the following steps.

Step S201: A compression end generates a first correspondence.

In this embodiment of this application, after receiving an Ethernet frame, the compression end generates the first correspondence based on a to-be-compressed field included in the received Ethernet frame. In this embodiment of this application, the Ethernet frame received by the compression end is the same as or different from the Ethernet frame in the embodiment corresponding to FIG. 7, and a value of the to-be-compressed field in the Ethernet header of the Ethernet frame in this embodiment of this application is same as the value of the first to-be-compressed field in the embodiment corresponding to FIG. 7.

The to-be-compressed field is the same as that in the descriptions in the foregoing embodiment, and is one or more fields in the Ethernet header. For example, the compression end alternatively generates the first correspondence based on one or more of the following fields: a destination MAC address, a source MAC address, a length/type field, TAG control information, a MAC client length/type, and the like. A specific manner of generating the first correspondence is not limited in this embodiment of this application.

During specific application, the compression end stores a pre-generated correspondence, where the correspondence includes a correspondence between compression information and a value of a to-be-compressed field. After the compression end receives the Ethernet frame including the first to-be-compressed field, when the correspondence stored by the compression end does not include the value of the first to-be-compressed field of the Ethernet frame, the compression end generates the first correspondence, where the first correspondence includes a CID and the value of the first to-be-compressed field. With reference to the foregoing embodiment, the correspondence is stored in a context information manner, and details are not described herein again. When the first to-be-compressed field is one field, a value of the first to-be-compressed field is a value of the field. When the first to-be-compressed field is a plurality of fields, a value of the first to-be-compressed field is a combination of values of the plurality of fields, and a length of a value of each field is directed by a profile. A combination manner of the values of the plurality of fields are determined based on the profile. For example, if a location relationship of the fields is in the profile, combination is performed based on a location sequence of the fields. This is not limited in this embodiment of this application.

For example, the compression end currently stores a correspondence including a CID 1 and a CID 2, a value of a to-be-compressed field of the CID 1 is A, and a value of a to-be-compressed field of the CID 2 is B. When a new Ethernet frame arrives at the compression end, a value of a to-be-compressed field of an Ethernet header is C, and a matching item of C is unable to be found in the currently stored correspondence, the compression end allocates a new CID, for example, a CID 3, to the first to-be-compressed field.

In an optional implementation, same as the foregoing embodiment, the compression information further includes a profile ID. When the compression end and the decompression end perform EHC based on a profile, the compression end and the decompression end determines the profile as a default profile, and perform compression or decompression based on the profile when performing compression or decompression. In this case, the compression information is excluded the profile ID.

Step S202: The compression end sends the first correspondence to the decompression end.

In this embodiment of this application, the compression end sends the first correspondence to the decompression end in an appropriate manner based on an actual application scenario. This is not limited in this embodiment of this application.

In an optional implementation, the compression end sends an uncompressed data packet to the decompression end, where the uncompressed data packet includes the first correspondence.

In this embodiment of this application, the compression end is configured to use the first correspondence and the received Ethernet frame as an uncompressed data packet for sending to the decompression end. In an optional implementation, the compression end sends the uncompressed data packet to the decompression end by using a PDCP data PDU. In another optional implementation, the compression end sends the first correspondence to the decompression end by using a packet data convergence protocol control protocol data unit PDCP control PDU, and send an Ethernet frame data packet to the decompression end by using a PDCP data PDU.

In an optional implementation of this embodiment of this application, the compression end sends the first correspondence to the decompression end for a plurality of times, and a quantity times threshold is further correspondingly set for the first correspondence. For example, the compression end maintains a sending quantity times variable for the first correspondence. An initial value of the variable is 0. The compression end sends the first correspondence once, and then the sending quantity times variable is accumulated by 1. When a quantity of times of sending the first correspondence to the decompression end by the compression end reaches the quantity times threshold, a consideration is the decompression end has successfully received the first correspondence. A consideration is the first correspondence has been synchronized between the compression end and the decompression end, and step S204 is unable to be performed. The quantity times threshold is predetermined in a protocol, or is a number that is greater than or equal to 1 and is configured by a network device. In a sidelink communication scenario, the quantity times threshold is determined by the compression end, or configured by another terminal device for the compression end. This is not limited in this embodiment of this application.

Step S203: The decompression end receives the first correspondence from the compression end.

In this embodiment of this application, the decompression end receives the first correspondence from the compression end in an appropriate manner based on an actual application scenario. A receiving manner is not limited in this embodiment of this application.

In an optional implementation, after the decompression end receives the first correspondence, when the correspondence stored by the decompression end does not include the first compression information, the decompression end stores the first correspondence.

In another optional implementation, after the decompression end receives the first correspondence, when the correspondence stored by the decompression end includes the first compression information, and a value of a to-be-decompressed field corresponding to the first compression information is different from a value of the first to-be-decompressed field, the decompression end modifies the value of the to-be-decompressed field corresponding to the first compression information to the first to-be-decompressed field.

With reference to the foregoing embodiment, the decompression end further stores the correspondence in a context information manner, and details are not described herein again.

Step S204: The decompression end sends feedback information to the compression end, where the feedback information is used to indicate a receiving status of the first correspondence.

In this embodiment of this application, the decompression end further sends the feedback information to the compression end, where the feedback information is used to indicate the receiving status of the first correspondence. For example, the receiving status includes a receiving success or a receiving failure. When the receiving status is the receiving success, the compression end and the decompression end performs corresponding compression and decompression processing based on the first correspondence. When the receiving status is the receiving failure, the compression end and the decompression end is unable to perform corresponding compression and decompression processing based on the first correspondence, and the compression end further resends the first correspondence to the compression end, delete the first correspondence, or the like. This is not limited in this embodiment of this application.

In an optional implementation, the feedback information includes the CID, or confirms a PDCP SN of a data packet that carries the first correspondence. The compression end determines, based on the CID or the PDCP SN, a correspondence that is unsuccessfully received.

In an optional implementation, the feedback information further includes at least one of the following: a profile ID, a first indication field, and a second indication field, where the first indication field is used to indicate that the first correspondence is a newly added correspondence or a modified correspondence at the decompression end, and the second indication field is used to indicate whether the feedback information is a positive feedback or a negative feedback. When the feedback information includes the CID and the at least one piece of the foregoing information, a length of bits occupied by the CID and each piece of information, and a location in the feedback information is not limited in this embodiment of this application.

Figure 13:
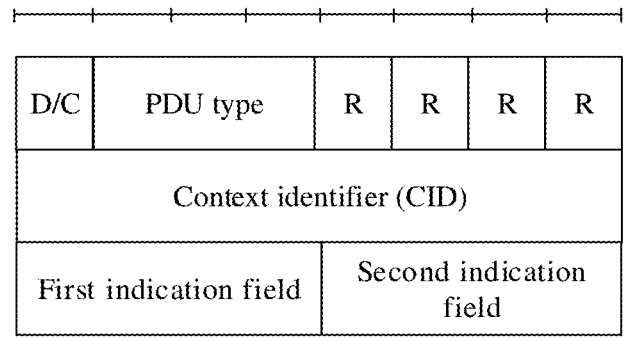
FIG. 13 is a schematic diagram of a format of feedback information according to an embodiment of this application.

For example, FIG. 13 shows a schematic diagram of a format of feedback information. In the schematic diagram of the format, the feedback information is sent by using a PDCP control PDU, and includes a CID field, a first indication field (AddOrModify), and a second indication field (AckType). The first byte is a header of the PDCP control PDU, where a value of a D/C field indicates that the PDCP PDU is a control PDU, and a value of a PDU type (type) indicates that the control PDU is a control PDU used to transmit the feedback information. For example, the value of the PDU type is a value other than '000' and '001', for example, '010' or '011'. A length value of the context identifier (context ID/CID) field is 2 to 16 bits. For example, a length of the context ID field is 5 bits, 6 bits, 7 bits, 8 bits, or 16 bits. A length value of the AckType field is 1 to 4 bits. For example, a length of the AckType field is 1 bit and a value is 1 or 0. AckType=1 indicates a successful feedback operation, and AckType=0 indicates an unsuccessful feedback operation; or AckType=0 indicates a successful feedback operation, and AckType=1 indicates an unsuccessful feedback operation. A length value of the AddOrModify field is 1 to 4 bits. For example, a length of the AddOrModify field is 1 bit and a value is 1 or 0. AddOrModify=1 indicates that a feedback is newly added context information, and AckType=0 indicates that a feedback is modified context information; or AddOrModify=0 indicates that a feedback is newly added context information, and AckType=1 indicates that a feedback is modified context information. A sequence of the foregoing fields are the CID field, the AckType field, and the AddOrModify field; the AckType field, the CID field, and the AddOrModify field; or the AckType field, the AddOrModify field, and the CID field. This is not limited in this embodiment of this application.

In an optional implementation of this embodiment of this application, to ensure byte alignment of the PDCP control PDU used for the feedback, the control PDU further has one or more reserved bits. For example, on the premise of the field sequence shown in FIG. 13, at least one of a location between the header of the PDCP control PDU and the CID, a location between the CID field and the AckType field, and a location between the AckType field and the AddOrModify field has at least one reserved bit.

As described in the foregoing embodiment, in an optional implementation of this embodiment of this application, the compression end further stores an indication variable of each correspondence, and the indication variable is used to indicate whether compression information of the corresponding correspondence is used for compression.

In this embodiment of this application, considering that the decompression end is unable to correctly receive the first correspondence, even if the first correspondence is generated by the compression end, the first correspondence is unable to be used for compression. Therefore, the compression end further stores an indication variable of the correspondence, and the indication variable is used to indicate whether compression information of the correspondence is used for compression. For example, a value of the indication variable includes 0 and 1. When the indication variable is 1, an indication the first correspondence is used for compression; when the indication variable is 0, an indication the first correspondence is unable to be used for compression. Alternatively, when the indication variable is 0, an indication the first correspondence is used for compression; when the indication variable is 1, an indication the first correspondence is unable to be used for compression.

Optionally, when the correspondence stored by the compression end includes the first correspondence corresponding to the first to-be-compressed field of the Ethernet frame, and the indication variable of the first correspondence indicates that the compression information of the first correspondence is not used for compression, the compression end sends the first correspondence to the decompression end.

In this embodiment of this application, for a manner in which the compression end sends the first correspondence to the decompression end, refer to the descriptions in step S202. Details are not described herein again.

Optionally, the compression end sets the indication variable to a first value when the compression end determines that the first correspondence is correctly received by the decompression end, where the first value is used to indicate that the compression information is used for compression.

In this embodiment of this application, there is a plurality of manners in which the compression end determines that the first correspondence is correctly received by the decompression end. For example, the compression end sends the first correspondence to the decompression end for N times, where N is a value greater than or equal to 1. In this case, the compression end determines that the first correspondence is correctly received by the decompression end. Alternatively, the compression end receives feedback information that is sent by the decompression end and is used to indicate that the first correspondence is correctly received. In this case, the compression end determines that the first correspondence is correctly received by the decompression end. A manner in which the compression end determines that the first correspondence is correctly received by the decompression end is not limited in this embodiment of this application.

In this embodiment of this application, the first value is set based on an actual application scenario, for example, is 1 or 0. This is not limited in this embodiment of this application.

During actual application, when the compression end initially generates the first correspondence, the indication variable of the first correspondence is set to a second value, and the second value is used to indicate that the compression information is unable to be used for compression. The second value is set based on an actual application scenario, for example, is 0 or 1. This is not limited in this embodiment of this application.

In an optional implementation, this embodiment of this application further includes: sending, by the compression end, second indication information to the decompression end, where the second indication information is used to indicate that the first correspondence is a newly added correspondence or a modified correspondence at the compression end.

In this embodiment of this application, considering that the first correspondence is a newly added correspondence, or is a previously existing correspondence but the corresponding indication variable indicates unavailability, the second indication information is used to indicate that the first correspondence is the newly added correspondence or the modified correspondence at the compression end.

In conclusion, in this embodiment of this application, a correspondence for compression and decompression is synchronized between the compression end and the decompression end. In this case, when an Ethernet data packet is subsequently transmitted between the compression end and the decompression end, the Ethernet header is compressed and decompressed based on the synchronized correspondence, to reduce occupation of communication resources by the Ethernet header.

In an optional implementation of step S202 in this embodiment of this application, in a manner in which the compression end sends the uncompressed data packet to the decompression end by using the PDCP data PDU, step S202 includes: The compression end sends the first correspondence to the decompression end by using the PDCP data PDU, where the PDCP data PDU includes an EHC header, the EHC header includes an indication field, the CID, and the Ethernet header, and the indication field is used to indicate whether the EHC header includes a complete or compressed Ethernet header, or is used to indicate whether the Ethernet header is compressed.

Figure 14:
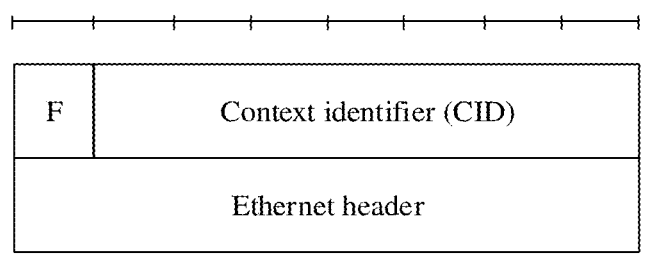
FIG. 14 is a schematic diagram of a format of a third EHC header according to an embodiment of this application.

For example, as shown in FIG. 14, when the compression end sends the first correspondence to the decompression end by using the PDCP data PDU, an indication field F of the EHC header is used to indicate whether the EHC header includes a complete or compressed Ethernet header, or is used to indicate whether the Ethernet header is compressed. For example, a length of the indication field F is 1 to 3 bits. For example, the length of F is 1 bit, and a value is 1 or 0. The decompression end determines, based on the value of the field F, whether the data packet carries the complete Ethernet header. A length value of a CID field is 2 to 16 bits. For example, a length of the CID field is 5 bits, 6 bits, 7 bits, 8 bits, or 16 bits. This field indicates an identifier corresponding to compression information used for header compression of the Ethernet frame. An Ethernet header field is an original Ethernet header and includes a to-be-compressed field and an uncompressed field. A sequence of the foregoing fields are the field F, the CID field, and the Ethernet header; or the CID field, the field F, and the Ethernet header. This is not limited in this embodiment of this application.

Figure 15:
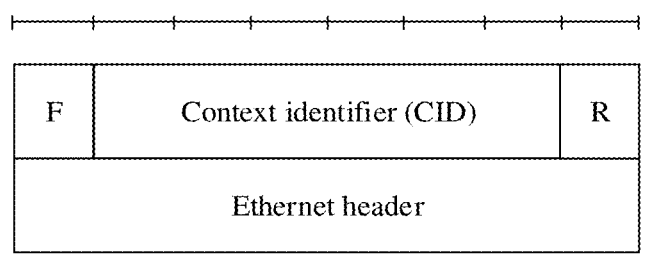
FIG. 15 is a schematic diagram of a format of a fourth EHC header according to an embodiment of this application.

In an optional implementation of this embodiment of this application, to ensure byte alignment of the EHC, the EHC further includes one or more reserved bits. For example, on the premise of the field sequence in FIG. 14, at least one of a location before the field F, a location between the field F and the CID field, and a location between the CID field and the Ethernet header has at least one reserved bit. For example, as shown in FIG. 15, the length of the F field is 1 bit, the length of the CID field is 6 bits, and one reserved bit is located between the CID field and the Ethernet header.

Optionally, when the first correspondence carries a profile ID, the indication field F is further used to indicate whether a first EHC header includes a profile identifier profile ID. When the indication field F is used to indicate that the profile ID is included, the EHC header further includes the profile ID. Alternatively, a new indication field is added to the EHC header, to indicate whether a first EHC header includes the profile ID.

Figure 16:
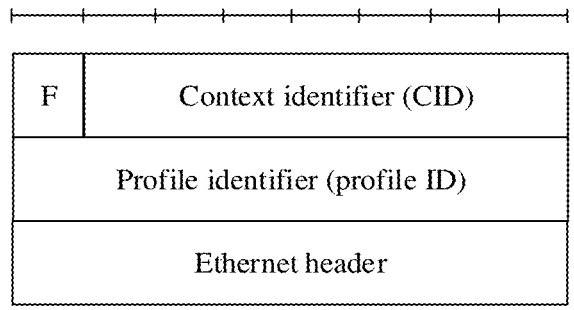
FIG. 16 is a schematic diagram of a format of a fifth EHC header according to an embodiment of this application.

For example, as shown in FIG. 16, when the compression end sends the first correspondence to the decompression end by using the PDCP data PDU, an indication field F of the EHC header is used to indicate whether the EHC header includes a complete or compressed Ethernet header and whether the EHC header carries a profile ID. A length of the indication field F is 1 to 3 bits. For example, a length of F is 1 bit, and a value is 1 or 0. The decompression end determines, based on the value of the field F, that the data packet carries the complete Ethernet header and carries a profile ID field. A length value of a CID field is 2 to 16 bits. For example, a length of the CID field is 5 bits, 6 bits, 7 bits, 8 bits, or 16 bits. This field indicates an identifier corresponding to compression information used for header compression of the Ethernet frame. A length value of the profile ID field is 2 to 8 bits. For example, a length of the profile ID field is 4 bits, 5 bits, 6 bits, or 8 bits. An Ethernet header field is an original Ethernet header and includes a to-be-compressed field and a to-be-uncompressed field. A sequence of the foregoing fields are the field F, the CID field, the profile ID field, and the Ethernet header; or the CID field, the field F, the profile ID field, and the Ethernet header.

Figure 17:
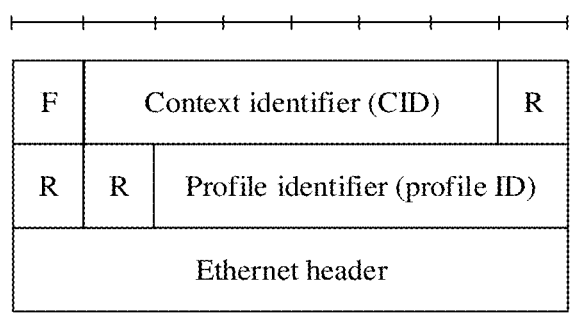
FIG. 17 is a schematic diagram of a format of a sixth EHC header according to an embodiment of this application.

In an optional implementation of this embodiment of this application, to ensure byte alignment of the EHC, the EHC further includes one or more reserved bits. For example, on the premise of the field sequence in FIG. 16, at least one of a location before the field F, a location between the field F and the CID field, a location between the CID field and the profile ID field, and a location between the profile ID field and the Ethernet header has at least one reserved bit. For example, as shown in FIG. 17, the length of the F field is 1 bit, the length of the CID field is 6 bits, the length of the profile ID is 6 bits, and three reserved bits are located between the CID field and the profile ID.

Optionally, the PDCP data PDU further includes a PDCP header, a service data adaptation protocol SDAP header, an Ethernet data payload, and a MAC-I. Similar to the format of the PDCP data PDU in FIG. 9, details are not described herein again.

In another optional implementation of step S202 in this embodiment of this application, in a manner in which the first correspondence is sent to the decompression end by using the PDCP control PDU and the Ethernet frame is sent to the decompression end by using the PDCP data PDU, step S202 includes: The compression end sends the first correspondence to the decompression end by using the PDCP control PDU, where the PDCP control PDU includes indication information, the CID, and a value of a compressible field of the Ethernet header, and the indication information is used to indicate that the PDCP control PDU is used for the first correspondence. Optionally, the PDCP control PDU is excluded a value of a to-be-compressed field, but the PDCP data PDU is subsequently sent to the decompression end, where the PDCP data PDU carries the Ethernet header, and a value of a to-be-compressed field in the Ethernet header is equal to the value of the to-be-compressed field.

Figure 18:
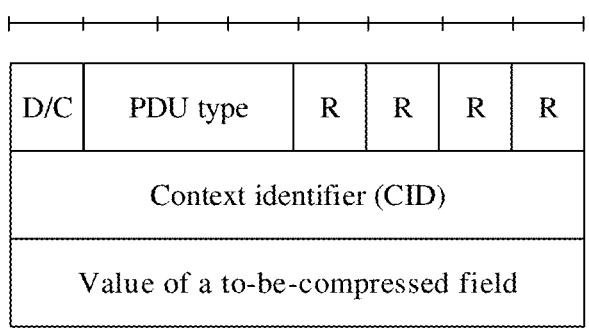
FIG. 18 is a schematic diagram of a format of a first PDCP data PDU according to an embodiment of this application.

For example, as shown in FIG. 18, in a manner in which the first correspondence is sent to the decompression end by using the PDCP control PDU and the Ethernet frame is sent to the decompression end by using the PDCP data PDU, indication information is a PDU type, and the first byte is a header of the PDCP control PDU, where a value of a D/C field indicates that the PDCP PDU is a control PDU, and a value of the PDU type indicates that the control PDU is a control PDU used to transmit the first correspondence. For example, the value of the PDU type is a value other than '000' and '001', for example, '010' or '011'. A length value of a CID field is 2 to 16 bits. For example, a length of the CID field is 5 bits, 6 bits, 7 bits, 8 bits, or 16 bits. This field indicates an identifier corresponding to compression information used for header compression of the Ethernet frame. A value of a to-be-compressed field is a value of a first to-be-compressed field in a first relationship corresponding to the CID field, that is, a value of the to-be-compressed field in the Ethernet header is included. A sequence of the foregoing fields are the CID field and the value of the to-be-compressed field; or the CID field and the value of the to-be-compressed field.

Figure 19:
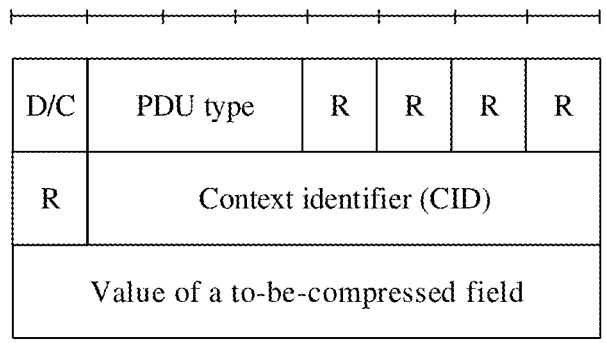
FIG. 19 is a schematic diagram of a format of a second PDCP data PDU according to an embodiment of this application.

In an optional implementation of this embodiment of this application, to ensure byte alignment of the PDCP control PDU, the control PDU further includes one or more reserved bits. For example, on the premise of the field sequence in FIG. 18, as shown in FIG. 19, there is at least one reserved bit R between a header of the control PDU and the CID field.

Optionally, when the first correspondence carries a profile ID, the PDCP control PDU further includes the profile ID.

Figure 20:
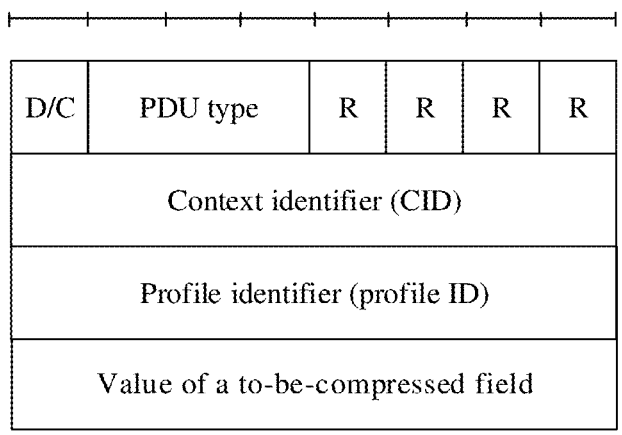
FIG. 20 is a schematic diagram of a format of a third PDCP data PDU according to an embodiment of this application.

For example, as shown in FIG. 20, the PDCP control PDU further includes a profile ID, where a value of a D/C field indicates that the PDCP PDU is a control PDU, and a value of a PDU type indicates that the control PDU is a control PDU used to transmit the first correspondence. For example, the value of the PDU type is a value other than '000' and '001', for example, '010' or '011'. A length value of a context identifier (context ID/CID) field is 2 to 16 bits. For example, a length of the context ID field is 5 bits, 6 bits, 7 bits, 8 bits, or 16 bits. This field indicates an identifier corresponding to compression information used for header compression of the Ethernet frame. A length value of a profile identifier (profile ID) field is 2 to 8 bits. For example, a length of the profile ID field is 4 bits, 5 bits, 6 bits, or 8 bits. A value of a to-be-compressed field is a value of a first to-be-compressed field in a first relationship corresponding to the CID field, that is, a value of the to-be-compressed field is included. A sequence of the foregoing fields are the CID field, the profile ID field, and the value of the to-be-compressed field; or the profile ID field, the CID field, and the value of the to-be-compressed field. That is, the sequence of these fields is not limited in this embodiment of this application.

Figure 21:
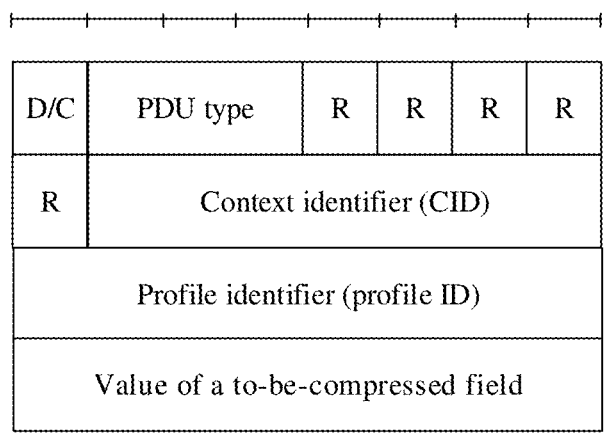
FIG. 21 is a schematic diagram of a format of a fourth PDCP data PDU according to an embodiment of this application.
Figure 22:
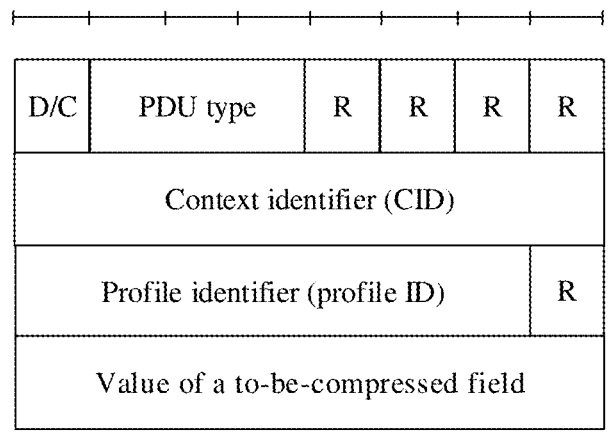
FIG. 22 is a schematic diagram of a format of a fifth PDCP data PDU according to an embodiment of this application.

In an optional implementation of this embodiment of this application, to ensure byte alignment of the PDCP control PDU, the control PDU further includes one or more reserved bits. For example, on the premise of the field sequence in FIG. 20, at least one of a location between a header of the control PDU and the CID field, a location between the CID field and the profile ID field, and a location between the profile ID field and the value of the to-be-compressed field has at least one reserved bit. For example, as shown in FIG. 21, there is at least one reserved bit between the header of the control PDU and the CID field. Alternatively, as shown in FIG. 22, the length of the CID field is 8 bits, the length of the profile ID is 7 bits, and there is one reserved bit between the profile ID and the value field of the to-be-compressed field.

In this embodiment of this application, the compression end further sends a PDCP data PDU to the decompression end, where the PDCP data PDU includes an EHC header, the EHC header carries an indication field, and the Ethernet header, and the indication field is used to indicate whether the EHC header carries a CID.

In this embodiment of this application, a length of the indication field F is 1 to 3 bits. For example, a length of F is 1 bit, and a value is 1 or 0. F=0 indicates that a subsequent Ethernet header is a compressed Ethernet header; F=1 indicates that a subsequent Ethernet header is an original Ethernet header. Alternatively, F=1 indicates that a subsequent Ethernet header is a compressed Ethernet header; F=0 indicates that a subsequent Ethernet header is an original Ethernet header. In this step, the compression end sends the uncompressed Ethernet frame to the decompression end. Therefore, the value of the field F indicates that the EHC header includes the compressed Ethernet header or indicates whether the Ethernet header is compressed. Whether the Ethernet header field is an original Ethernet header or a compressed Ethernet header obtained after the to-be-compressed field is removed is indicated by the indication field F. Optionally, when the EHC header carries the CID, the Ethernet header is the compressed Ethernet header; or when the EHC header does not carry the CID, the Ethernet header is the complete Ethernet header.

Figure 23:
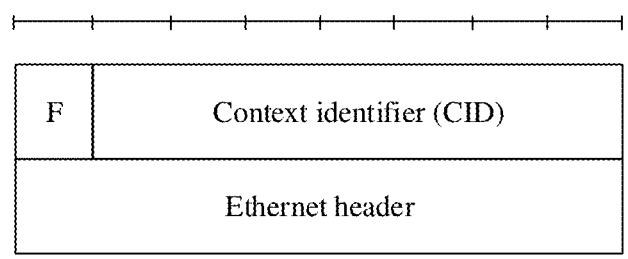
FIG. 23 is a schematic diagram of a format of a seventh EHC header according to an embodiment of this application.

For example, a format of the EHC header is that shown in FIG. 23. A length value of a context identifier (context ID/CID) field is 2 to 16 bits. For example, a length of the context ID field is 5 bits, 6 bits, 7 bits, 8 bits, or 16 bits. This field indicates an identifier corresponding to compression information used for header compression of the Ethernet frame. When the value of F indicates that the subsequent Ethernet header is the original frame header, the decompression end ignores a value of the CID field, or the EHC header does not include the CID field. In this case, to ensure byte alignment of the EHC header, an extra bit location is filled with a reserved bit. Whether the Ethernet header field is the original Ethernet header or the compressed Ethernet header obtained after the first to-be-compressed field is removed is indicated by the indication field F. A sequence of the foregoing fields are that the field F is located before the CID field, and the CID field is located before the Ethernet header field; or the CID field is located before the field F, and the field F is located before the Ethernet header field. That is, the sequence of these fields is not limited in this embodiment of this application.

In an optional implementation of this embodiment of this application, to ensure byte alignment of the EHC, the EHC further includes one or more reserved bits, for example, at least one of a location before the field F, a location between the field F and the CID field, and a location between the CID field and the Ethernet header has at least one reserved bit.

Optionally, the first PDCP data PDU further includes a PDCP header, a service data adaptation protocol SDAP header, an Ethernet data payload, and a MAC-I. Similar to the format of the PDCP data PDU in FIG. 9, details are not described herein again.

In this embodiment of this application, in a scenario in which the compression end transmits the compressed Ethernet frame to the decompression end and the decompression end decompresses the compressed Ethernet frame, a check process is further set to improve a correct rate of compression and decompression. Therefore, in step S104, the EHC header of the PDCP data PDU used to send the compressed Ethernet frame to the decompression end further includes check information.

Figure 24:
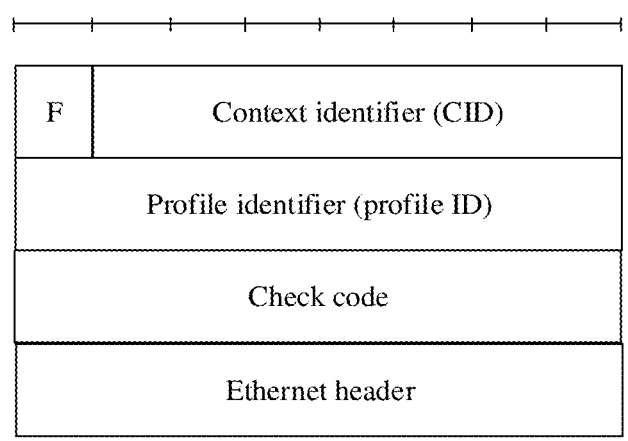
FIG. 24 is a schematic diagram of a format of an eighth EHC header according to an embodiment of this application.

FIG. 24 is a schematic diagram of a format of an EHC header including a check code. The check code is located between a profile ID and an Ethernet header. When the EHC header does not include the profile ID, the check code is located between a CID and the Ethernet header. Alternatively, the check code is located after the Ethernet header, or between a field F and the CID. That is, a sequence of these fields is not limited in this embodiment of this application. During application, to align bytes of the EHC header, one or more reserved bits alternatively is corresponding added to the EHC header. This is not limited in this embodiment of this application.

In this embodiment of this application, the check information is generated based on one or more pieces of information in the first correspondence.

For example, the check information is a cyclic redundancy check (cyclic redundancy check, CRC) or is a checksum (checksum).

In an optional implementation of this embodiment of this application, during an implementation in which the check information is the CRC, after receiving an Ethernet frame, the compression end generates first check information $CRC_1$ of X (where X is determined based on actual application) bits by using a polynomial based on one or more of a corresponding compressed field value in a to-be-used correspondence, a complete CID, a complete profile ID, an original Ethernet header, and the like as input.

Correspondingly, after receiving a compressed Ethernet frame, the decompression end further determines a to-be-used correspondence for decompression based on a CID and/or a profile ID in an EHC header, and generate second check information $CRC_2$ of X bits by using a generation polynomial that is the same as that of the compression end based on one or more of a corresponding compressed field value in the correspondence, the complete CID, the complete profile ID, a decompressed Ethernet header, and the like as input. If the $CRC_2$ is not equal to the CRCs, a determination is the decompression fails. Alternatively, if the decompression end is unable to find context information corresponding to the CID, a determination is the decompression fails.

In another optional implementation of this embodiment of this application, during an implementation in which the check information is the checksum, after receiving an Ethernet frame, the compression end generates first check information $checksum_1$ of X (where X is determined based on actual application) bits by using a checksum algorithm based on one or more of a corresponding compressed field value in a to-be-used correspondence, a complete CID, a complete profile ID, an original Ethernet header, and the like as input.

Correspondingly, after receiving a compressed Ethernet frame, the decompression end further determines a to-be-used correspondence for decompression based on a CID and/or a profile ID in an EHC header, and generate second check information $checksum_2$ of X bits by using a checksum algorithm that is the same as that of the compression end based on one or more of a corresponding compressed field value in the correspondence, the complete CID, the complete profile ID, a decompressed Ethernet header, and the like as input. If the $checksum_2$ is not equal to the $checksum_1$, a determination is the decompression fails. Alternatively, if the decompression end is unable to find context information corresponding to the CID, a determination is the decompression fails.

In an optional implementation, the decompression end decompresses the Ethernet header of the to-be-decompressed Ethernet frame based on the value of the first to-be-decompressed field when the first check information is the same as the second check information; or the decompression end deletes the first correspondence, and/or the decompression end sends an error report to the compression end when the first check information is different from the second check information.

In this embodiment of this application, when the first check information is different from the second check information, the decompression end determines that the check fails, and the decompression end deletes the first correspondence stored by the decompression end, send the error report to the compression end, or delete the first correspondence stored by the decompression end and send the error report to the compression end. This is not limited in this embodiment of this application.

In this embodiment of this application, the error report is used to indicate that the check fails, and the decompression end is unable to decompress the compressed Ethernet frame. The error report carries the CID and/or the profile ID. Optionally, the error report further carries a CRC 3, where the CRC 3 is generated by using a generation polynomial based on the error report as input.

In an optional implementation of this embodiment of this application, when the compression end receives the error report returned by the decompression end based on the check information, the compression end deletes the first correspondence, or the compression end sets the first correspondence to being unavailable.

In this embodiment of this application, the compression end may set an indication variable corresponding to the first correspondence to a second value, to indicate that the first correspondence is unavailable. During application, if the first correspondence further corresponds to a quantity of sending times of sending the first correspondence to the decompression end, the quantity of sending times are set to an initial value. For example, the initial value is 0.

In an optional implementation of this embodiment of this application, when determining a check error, the decompression end clears correspondences stored by the decompression end, and feed back an error report to the compression end, where the error report does not carry the CID or the profile ID. Correspondingly, after receiving the error report, the compression end clears correspondences, or set correspondences to being unavailable. If the correspondence further corresponds to a quantity of sending times, the quantity of sending times is set to an initial value (for example, 0).

In this embodiment of this application, a check mechanism is introduced, to avoid an error in decompressing a data packet due to inconsistent correspondences stored by the compression end and the decompression end, and improve a correct rate of compression and decompression.

Before performing the foregoing compression and decompression, the compression end and the decompression end in this embodiment of this application is further pre-configured with a capability of performing EHC. In an optional configuration implementation of this embodiment of this application, the compression end is a terminal, the decompression end is a network device, and the method further includes:

sending, by the compression end, capability information to the decompression end, where the capability information includes at least one of the following: a capability of the compression end supporting EHC, a quantity of data radio bearers (DRBs) supporting the EHC at the compression end, profile information supported by the compression end, a maximum value MAX_CID of entries of correspondences supported by each DRB supporting the EHC, a capability of the compression end supporting dynamic configuration of a profile parameter, and a sum of entries of correspondences maintained by DRBs supporting the EHC at the compression end.

In this embodiment of this application, the capability of the compression end supporting the EHC includes a capability of the compression end supporting uplink EHC, and/or a capability of the compression end supporting downlink EHC. The quantity of DRBs supporting the EHC at the compression end is used to indicate a maximum quantity of DRBs that is configured at the compression end to perform an EHC operation. When the compression end does not indicate the information, a maximum quantity of DRBs supporting the EHC at the compression end is specified in a protocol, or an indication that the quantity of DRBs supporting the EHC at the compression end is not limited. The profile information supported by the compression end includes uplink profile information supported by the compression end, and/or downlink profile information supported by the compression end that is used to indicate profiles corresponding to Ethernet protocol frames on which the compression end performs EHC processing. If the information is not indicated, an indication the compression end supports EHC processing on Ethernet protocol frames corresponding to profiles set in a protocol. Other capabilities, for example, a quantity MAX_CID supported by one DRB, and a total quantity of supported CIDs are separately indicated in terms of an uplink and/or a downlink. For the maximum value MAX_CID of entries of correspondence supported by each DRB supporting the EHC, when the compression end does not indicate the MAX_CID, the MAX_CID supported by one DRB is in the protocol, or an indication that there is no limitation. When the compression end does not indicate information about the capability of the compression end supporting the dynamic configuration of the profile parameter, an indication that the compression end supports/does support the network device in dynamically configure the profile parameter. When the compression end stores and maintains a correspondence, a memory is used to store the correspondence. From a perspective of the terminal device, a supported memory is limited. Therefore, a memory that is used to store the correspondence further is limited. When the compression end does not indicate the sum of entries of correspondences maintained by the DRBs supporting the EHC at the compression end, a total quantity of correspondences supported by the compression end is in the protocol, or an indication that there is no limitation.

Optionally, the capability information further includes a capability of the compression end supporting processing of feedback information of the decompression end. When the compression end does not indicate the information, an indication that the compression end supports/does support processing of the feedback information. The capability information further includes a capability of the compression end supporting sending of the first correspondence for a plurality of times. When the compression end does not indicate the information, an indication that the compression end supports/does support sending of the first correspondence for the plurality of times.

During application, the compression end sends the capability information to the decompression end by using a radio resource control (RRC) message, or sends the capability information to the decompression end in another manner. This is not limited in this embodiment of this application.

Correspondingly, the decompression end configures, for the compression end, at least one of the following: information about a DRB or a packet data convergence protocol PDCP entity supporting the uplink EHC, information about a DRB or a PDCP entity supporting the downlink EHC, profile information supported by the DRB or the PDCP entity supporting the uplink EHC, profile information supported by the DRB or the PDCP entity supporting the downlink EHC, a maximum value of entries of compression context information used when each DRB or PDCP entity performs an EHC operation, a sum of entries of compression context information maintained by a DRB supporting the EHC at the compression end, a feedback operation performed for the EHC, a plurality of sending operations of sending the first correspondence that are performed for the EHC, and a threshold of sending times used when the first correspondence is sent for a plurality of times. Optionally, the decompression end configures the foregoing content for the compression end by using RRC signaling.

In an optional implementation in this embodiment of this application, when the MAX_CID is configured at the compression end, if found that entries of previously stored correspondences have reached the MAX_CID, no new correspondence is established for a subsequent data packet, and an existing correspondence is used to compress the data packet. If a correspondence is unable to be found for a new arrival data packet, compression processing is not performed. For example, if CIDs at the compression end are used up, compression processing is unable to be performed on the subsequent data packet, and the first correspondence is further not carried when the data packet is sent, or the terminal is unable to perform compression processing on a part of data packets based on the implementation. In this case, there is two considerations for an encapsulation format of the data packet. In one case, considering that the EHC header in the PDCP data PDU does not include the profile ID field, the field F in the EHC header indicates that the data packet is an uncompressed data packet, and the value of the context ID field is a reserved value, for example, all 0s or all 1s, the compression end receives the data packet, and determines, based on the value of the field F and the reserved value of the CID, that the data packet is the uncompressed data packet and does not carry the first correspondence. In another case, considering that the EHC header in the PDCP data PDU includes the profile ID field, the field F in the EHC header indicates that the data packet is an uncompressed data packet, and the values/value of the context ID field and/or the profile ID field are/is reserved values/a reserved value, for example, all 0s or all 1s, the compression end receives the data packet, and determines, based on the value of the field F and the reserved value of the CID and/or the reserved value of the profile ID, that the data packet is the uncompressed data packet and does not carry the first correspondence.

In another optional implementation of this embodiment of this application, when the MAX_CID is configured at the compression end, if found that entries of previously stored correspondences have reached the MAX_CID, the compression end still generates the first correspondence, and replaces any entry of the previously stored correspondences with the first correspondence, to store the first correspondence. The any entry is randomly selected by the compression end or determined in another manner. This is not limited in this embodiment of this application.

In an optional implementation of this embodiment of this application, the method further includes: receiving, by the terminal, configuration information, where the configuration information is further used to indicate whether the EHC header carries the profile ID, or the configuration information further includes the profile ID and the EHC header does not include the profile ID.

In this embodiment of this application, when RRC is used to configure that one DRB supports one profile, an EHC header of a data packet of the DRB does not carry the profile ID; when RRC is not used to configure that one DRB supports one profile, an EHC header needs to carry the profile ID.

In a implementation in which the configuration information is further used to indicate whether the EHC header carries the profile ID, the terminal receives the configuration information sent by the network device by using the RRC, and the RRC indicates, by using a field, whether the EHC header carries the profile ID. For example, a presence of profile ID field is used to indicate whether the EHC header carries the profile ID. For example, if the presence of profile ID field is carried in a PDCP configuration information element, an indication that the EHC header carries the profile ID; if the presence of profile ID field is not carried, the EHC header does not carry the profile ID.

Optionally, a value of the presence of profile ID is further set to 1 or 0, where 1 indicates that the EHC header carries the profile ID, and 0 indicates that the EHC header does not carry the profile ID. Alternatively, 0 indicates that the EHC header carries the profile ID, and 1 indicates that the EHC header does not carry the profile ID.

Optionally, a presence of profile ID field is further separately configured for an uplink EHC operation and a downlink EHC operation of the terminal, to indicate whether an uplink EHC header and a downlink EHC header each carry a profile ID. For example, a presence of profile ID-UL field is configured to indicate whether the uplink EHC header carries the profile ID, and a presence of profile ID-DL field is configured to indicate whether the downlink EHC header carries the profile ID. Alternatively, a value of the presence of profile ID-UL is set to 1 or 0, where 1 indicates that the uplink EHC header carries the profile ID, and 0 indicates that the uplink EHC header does not carry the profile ID; or 0 indicates that the uplink EHC header carries the profile ID, and 1 indicates that the uplink EHC header does not carry the profile ID. A value of the presence of profile ID-DL is 1 or 0, where 1 indicates that the downlink EHC header carries the profile ID, and 0 indicates that the downlink EHC header does not carry the profile ID; or 0 indicates that the downlink EHC header carries the profile ID, and 1 indicates that the downlink EHC header does not carry the profile ID. Values of the fields are not limited in this embodiment of this application.

Optionally, whether an EHC data packet of the DRB carries the profile ID field is implicitly determined based on a quantity, configured by using the RRC, of profiles supported by the DRB. For example, if the quantity, configured by using the RRC, of profiles supported by the DRB is 1, a consideration is that the profile ID is not carried. If the quantity, configured by using the RRC, of profiles supported by the DRB is a value greater than 1, a consideration is that the profile ID is carried.

In a implementation in which the configuration information further includes the profile ID and the EHC header does not include the profile ID, the profile ID of the terminal is configured by using the configuration information, so that the EHC header is excluded the profile ID, to reduce a size of the EHC header and reduce occupation of communication resources.

In an optional configuration implementation of this embodiment of this application, the compression end is a network device, the decompression end is a terminal, and the method further includes:

receiving, by the compression end, capability information, where the capability information includes at least one of the following: a capability of the decompression end supporting EHC, a quantity of data radio bearers DRBs supporting the EHC at the decompression end, profile information supported by the decompression end, a maximum value MAX_CID of entries of correspondences supported by each DRB supporting the EHC, a capability of the decompression end supporting dynamic configuration of a profile parameter, and a sum of entries of correspondences maintained by DRBs supporting the EHC at the decompression end.

In this embodiment of this application, after receiving the capability information of the decompression end, the compression end correspondingly configures, for the decompression end, at least one of the following: information about a DRB or a packet data convergence protocol PDCP entity supporting the uplink EHC, information about a DRB or a PDCP entity supporting the downlink EHC, profile information supported by the DRB or the PDCP entity supporting the uplink EHC, profile information supported by the DRB or the PDCP entity supporting the downlink EHC, a maximum value of entries of compression context information used when each DRB or PDCP entity performs an EHC operation, and a sum of entries of compression context information maintained by a DRB supporting the EHC at the compression end. Optionally, the compression end configures the foregoing content for the decompression end by using RRC signaling.

In an optional implementation of this embodiment of this application, the method further includes: sending, by the network device, configuration information to the terminal, where the configuration information is further used to indicate whether the EHC header carries a profile ID, or the configuration information further includes a profile ID and the EHC header does not include the profile ID.

For a configuration process, refer to the configuration process in the foregoing embodiment. Details are not described herein again.

In an optional configuration implementation of this embodiment of this application, the compression end is a terminal, the decompression end is a terminal, and the method further includes:

receiving, by the compression end, capability information, where the capability information includes at least one of the following: a capability of the decompression end supporting EHC, a quantity of data radio bearers DRBs supporting the EHC at the decompression end, profile information supported by the decompression end, a maximum value MAX_CID of entries of correspondences supported by each DRB supporting the EHC, a capability of the decompression end supporting dynamic configuration of a profile parameter, and a sum of entries of correspondences maintained by DRBs supporting the EHC at the decompression end.

In this embodiment of this application, in a scenario in which two terminals communicates with each other through a sidelink, the two terminals exchanges a capability of supporting EHC by using sidelink messages, for example, the two terminals directly exchange an EHC capability of a sidelink interface by using sidelink RRC messages, or the two terminals exchange an EHC capability of a sidelink interface through a base station or another terminal. In other words, in this embodiment of this application, the compression end receives the capability information of the decompression end by using a sidelink message, or receive the capability information of the decompression end through the base station or the another terminal. This is not limited in this embodiment of this application.

Correspondingly, the decompression end further receives the capability information of the compression end, to exchange the capability information between the decompression end and the compression end. Details are not described herein again.

In an optional implementation of this embodiment of this application, the compression end and the decompression end further exchanges configuration information, where the configuration information is further used to indicate whether the EHC header carries the profile ID, or the configuration information further includes the profile ID and the EHC header does not include the profile ID. Details are not described herein again.

For a configuration process, refer to the configuration process in the foregoing embodiment. Details are not described herein again.

In an optional implementation of this embodiment of this application, there is a scenario in which the compression end or the decompression end is handed over. In an example, when the compression end is a terminal, and the decompression end is a network device, the compression end is handed over to different network devices. Correspondingly, in this handover procedure, a decompression end that initially communicates with the compression end is referred as a source station, and a decompression end to which the compression end is to be handed over for communication is referred to as a target station. The source station may deliver a correspondence of a part or all of DRBs in the source station to the target station by using a handover request (HR) message. Further, the target station configures EHC continue (continue) for a part or all DRBs at the compression end. In this case, the compression end does not need to clear a correspondence of a corresponding DRB, and continues to perform an EHC operation by using an original correspondence, to reduce a quantity of times of generating the correspondence by the compression end and reduce occupation of computing resources. Alternatively, the target station is unable to configure EHC continue for a part or all DRBs at the compression end. In this case, the compression end clears a correspondence of a corresponding DRB, to reduce occupation of storage space.

In an optional implementation of this embodiment of this application, there is a scenario in which the compression end and the decompression end are reestablished. When the compression end and the decompression end are reestablished, the correspondence stored by the compression end and the correspondence stored by the decompression end remains unchanged. In this way, the compression end and the decompression end continues to perform an EHC operation by using the original correspondence after reestablishment, so that a quantity of times of generating the correspondence by the compression end is reduced, and occupation of computing resources is reduced. When the compression end and the decompression end are reestablished, the correspondence stored by the compression end and the correspondence stored by the decompression end alternatively is cleared, to reduce occupation of storage space.

An embodiment of this application further provides an apparatus configured to implement any one of the foregoing methods. For example, an apparatus is provided, and includes units (or means) configured to implement the steps performed by the terminal in any one of the foregoing methods. For another example, another apparatus is further provided, and includes units (or means) configured to implement the steps performed by the access network device in any one of the foregoing methods. For another example, another apparatus is further provided, and includes units (or means) configured to implement the steps performed by the core network device in any one of the foregoing methods.

Figure 25:
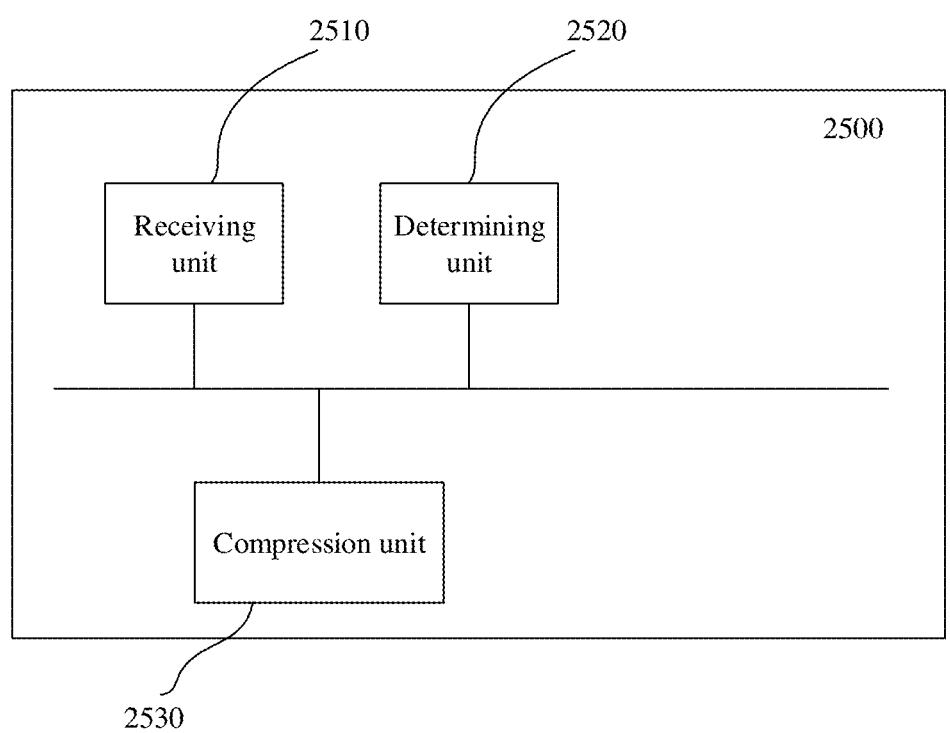
FIG. 25 is a schematic diagram of an Ethernet frame compression apparatus according to an embodiment of this application.

For example, FIG. 25 is a schematic diagram of an Ethernet header compression apparatus according to an embodiment of this application. The apparatus is used at a compression end. As shown in FIG. 25, the apparatus 2500 includes a receiving unit 2510, a determining unit 2520, and a compression unit 2530. The receiving unit 2510 is configured to receive a first Ethernet frame, where an Ethernet header of the first Ethernet frame includes a first to-be-compressed field. The determining unit 2520 is configured to determine first compression information of the Ethernet header of the first Ethernet frame based on a first correspondence and the first to-be-compressed field, where the first correspondence includes a correspondence between the first compression information and a value of the first to-be-compressed field, and the first compression information includes a first context identifier CID. The compression unit 2530 is configured to compress the Ethernet header of the first Ethernet frame based on the first compression information.

Optionally, the apparatus 1700 further includes a first relationship generation unit, configured to generate the first correspondence when a correspondence stored by the compression end does not include the value of the first to-be-compressed field of the first Ethernet frame, where the correspondence stored by the compression end includes a correspondence between at least one piece of compression information and a value of a to-be-compressed field.

Optionally, the apparatus further includes a sending unit, configured to send the first correspondence to a decompression end.

Optionally, the sending unit is configured to send an uncompressed data packet to the decompression end, where the uncompressed data packet includes the first correspondence.

Optionally, the sending unit is further configured to send the first correspondence to the decompression end by using a first packet data convergence protocol data protocol data unit PDCP data PDU, where the first PDCP data PDU includes a first Ethernet header compression EHC header, the first EHC header includes a first indication field, the first CID, and an Ethernet header of a second Ethernet frame, a value of a to-be-compressed field in the Ethernet header of the second Ethernet frame is equal to the value of the first to-be-compressed field, and the first indication field is used to indicate whether the first EHC header includes a complete Ethernet header.

Optionally, the first EHC header further includes a first profile identifier profile ID.

Optionally, the first indication field is further used to indicate that the first EHC header includes the first profile ID.

Optionally, the first PDCP data PDU further includes a PDCP header, a service data adaptation protocol SDAP header, an Ethernet data payload, and a message authentication code for integrity MAC-I.

Optionally, the sending unit is further configured to send the first correspondence to the decompression end by using a packet data convergence protocol control protocol data unit PDCP control PDU, where the PDCP control PDU includes first indication information, the first CID, and the value of the first to-be-compressed field, and the first indication information is used to indicate that the PDCP control PDU is used to transmit the first correspondence.

Optionally, the PDCP control PDU further includes a profile ID.

Optionally, the sending unit is further configured to send a first PDCP data PDU to the decompression end, where the first PDCP data PDU includes a first EHC header, the first EHC header includes a first indication field and an Ethernet header of a second Ethernet frame, a value of a to-be-compressed field in the Ethernet header of the second Ethernet frame is equal to the value of the first to-be-compressed field, and the first indication field is used to indicate whether the first EHC header carries the first CID.

Optionally, when the first EHC header carries the first CID, the Ethernet header of the second Ethernet frame is a compressed Ethernet header; or when the first EHC header does not carry the first CID, the Ethernet header of the second Ethernet frame is a complete Ethernet header.

Optionally, the first PDCP data PDU further includes a PDCP header, a service data adaptation protocol SDAP header, an Ethernet data payload, and a message authentication code for integrity MAC-I.

Optionally, the sending unit is further configured to send the first correspondence to the decompression end for a plurality of times.

Optionally, the receiving unit is further configured to receive feedback information from the decompression end, where the feedback information is used to indicate a receiving status of the first correspondence.

The feedback information includes the first CID.

Optionally, the feedback information further includes at least one of the following: the first profile ID, a second indication field, and a third indication field, the second indication field is used to indicate that the first correspondence is a newly added correspondence or a modified correspondence at the decompression end, and the third indication field is used to indicate that the feedback information is a positive feedback or a negative feedback.

Optionally, the compression end further stores an indication variable of the correspondence, and the indication variable is used to indicate whether compression information of the correspondence is used for compression.

Optionally, the sending unit is further configured to send the first correspondence to a decompression end when a correspondence stored by the compression end includes the first correspondence corresponding to the first to-be-compressed field, and an indication variable of the first correspondence is used to indicate that compression information of the first correspondence is not used for compression.

Optionally, the apparatus further includes a variable setting unit, configured to set, by the compression end, the indication variable to a first value when the compression end determines that the first correspondence is correctly received by the decompression end, where the first value is used to indicate that the compression information is used for compression.

Optionally, the first compression information further includes the first profile ID.

Optionally, the sending unit is further configured to send second indication information to the decompression end, where the second indication information is used to indicate that the first correspondence is a newly added correspondence or a modified correspondence at the compression end.

Optionally, the sending unit is further configured to send a compressed first Ethernet frame to the decompression end, where the compressed first Ethernet frame includes the first CID and does not include a profile identifier profile ID.

Optionally, that the sending unit is further configured to send a compressed first Ethernet frame to the decompression end includes: The compression end sends the compressed first Ethernet frame to the decompression end by using a second PDCP data PDU.

Optionally, the second PDCP data PDU includes a second EHC header, and the second EHC header further includes check information.

Optionally, the check information is generated based on one or more pieces of information in the first correspondence.

Optionally, the apparatus further includes a setting unit, configured to: when the compression end receives an error report returned by the decompression end based on the check information, delete the first correspondence, or set the first correspondence to being unavailable.

Optionally, the compression end is a terminal, the decompression end is a network device, and the sending unit is further configured to send capability information to the decompression end, where the capability information includes at least one of the following: a capability of the compression end supporting EHC, a quantity of data radio bearers DRBs supporting the EHC at the compression end, profile information supported by the compression end, a maximum value MAX_CID of a quantity of correspondences supported by each DRB supporting the EHC, a capability of the compression end supporting dynamic configuration of a profile parameter, and a sum of quantities of correspondences maintained by DRBs supporting the EHC at the compression end.

Optionally, the receiving unit is further configured to receive configuration information, where the configuration information is used to indicate whether an EHC header carries a profile ID, or the configuration information includes a profile ID.

Optionally, the compression end is a network device or a terminal, and the receiving unit is further configured to receive capability information, where the capability information includes at least one of the following: a capability of the compression end supporting EHC, a quantity of data radio bearers DRBs supporting the EHC at the compression end, profile information supported by the compression end, a maximum value MAX_CID of a quantity of correspondences supported by each DRB supporting the EHC, a capability of the compression end supporting dynamic configuration of a profile parameter, and a sum of quantities of correspondences maintained by DRBs supporting the EHC at the compression end.

Optionally, the sending unit is further configured to send configuration information to the decompression end, where the configuration information is further used to indicate whether an EHC header carries a profile ID, or the configuration information includes a profile ID.

For a implementation, refer to the descriptions of the method embodiments. Details are not described herein again.

Figure 26:
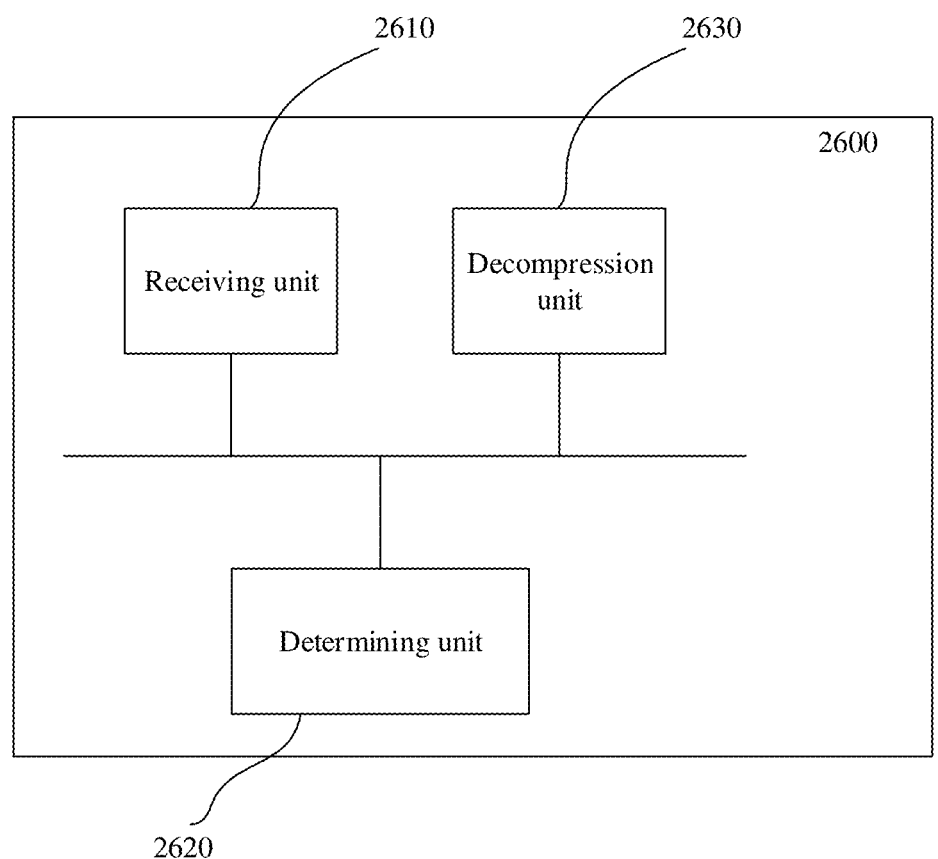
FIG. 26 is a schematic diagram of an Ethernet frame decompression apparatus according to an embodiment of this application.

For example, FIG. 26 is a schematic diagram of an Ethernet header decompression apparatus according to an embodiment of this application. The apparatus is used at a decompression end. As shown in FIG. 26, the apparatus 2600 includes a receiving unit 2610, a determining unit 2620, and a decompression unit 2630. The receiving unit 2610 is configured to receive a first Ethernet frame and a first context identifier CID. The determining unit 2620 is configured to determine, based on the first CID, a first correspondence including the first CID, where the first correspondence includes a correspondence between first compression information and a value of a first to-be-decompressed field, and the first compression information includes the first CID. The decompression unit 2630 is configured to decompress an Ethernet header of the first Ethernet frame based on the first compression information and the value of the first to-be-decompressed field in the first correspondence.

Optionally, the receiving unit is further configured to receive the first correspondence from a compression end.

Optionally, the receiving unit is configured to receive an uncompressed data packet, where the uncompressed data packet includes the first correspondence.

Optionally, the receiving unit is further configured to receive the first correspondence from the compression end by using a PDCP data PDU, where the first PDCP data PDU includes a first Ethernet header compression EHC header, the first EHC header includes a first indication field, the first CID, and an Ethernet header of a second Ethernet frame, a value of a to-be-compressed field in the Ethernet header of the second Ethernet frame is equal to the value of the first to-be-compressed field, and the first indication field is used to indicate whether the first EHC header includes a complete Ethernet header.

Optionally, the first EHC header further includes a first profile identifier profile ID.

Optionally, the first indication field is further used to indicate that the first EHC header includes the first profile ID.

Optionally, the first PDCP data PDU further includes a PDCP header, a service data adaptation protocol SDAP header, an Ethernet data payload, and a message authentication code for integrity MAC-I.

Optionally, the receiving unit is further configured to receive the first correspondence sent by the compression end by using a PDCP control PDU, where the PDCP control PDU includes first indication information, a CID, and the value of the first to-be-compressed field, and the first indication information is used to indicate that the PDCP control PDU is used to transmit the first correspondence.

Optionally, the PDCP control PDU further includes a first profile ID.

Optionally, the receiving unit is further configured to receive a first PDCP data PDU from the compression end, where the first PDCP data PDU includes a first EHC header, the first EHC header includes a first indication field and an Ethernet header of a second Ethernet frame, a value of a to-be-compressed field in the Ethernet header of the second Ethernet frame is equal to the value of the first to-be-compressed field, and the first indication field is used to indicate whether the first EHC header carries the first CID.

Optionally, when the first EHC header carries the first CID, the Ethernet header of the second Ethernet frame is a compressed Ethernet header; or when the first EHC header does not carry the first CID, the Ethernet header of the second Ethernet frame is a complete Ethernet header.

Optionally, the first PDCP data PDU further includes a PDCP header, a service data adaptation protocol SDAP header, an Ethernet data payload, and a message authentication code for integrity MAC-I.

Optionally, the decompression end stores a correspondence between at least one piece of compression information and a value of a to-be-decompressed field. A first correspondence setting unit is further included, and is configured to store the first correspondence when the correspondence stored by the decompression end does not include the first compression information; or modify a value of a to-be-decompressed field corresponding to the first compression information to the value of the first to-be-decompressed field when the correspondence stored by the decompression end includes the first compression information, and the value of the to-be-decompressed field corresponding to the first compression information is different from the value of the first to-be-decompressed field.

Optionally, the apparatus further includes a sending unit, configured to send feedback information to the compression end, where the feedback information is used to indicate a receiving status of the first correspondence.

Optionally, the feedback information includes the first CID.

Optionally, the feedback information further includes at least one of the following: a profile ID, a first indication field, and a second indication field, the first indication field is used to indicate that the first correspondence is a newly added correspondence or a modified correspondence at the decompression end, and the second indication field is used to indicate that the feedback information is a positive feedback or a negative feedback.

Optionally, the first Ethernet frame further includes first check information.

Optionally, the first check information is generated based on one or more pieces of information in the first correspondence.

Optionally, the apparatus further includes a check unit, configured to: generate second check information based on the one or more pieces of information in the first correspondence; and decompress, by the compression end, the Ethernet header of the first Ethernet frame when the first check information is the same as the second check information; or delete, by the compression end, the first correspondence, and/or send, by the compression end, an error report to the compression end when the first check information is different from the second check information.

Division into the units in the foregoing apparatus is merely logical function division. During actual implementation, all or some of the units are integrated into one physical entity, or is physically separate. In addition, the units in the apparatus are implemented in a form of software invoked by a processing element, or is implemented in a form of hardware; or some units are implemented in a form of software invoked by a processing element, and some units are implemented in a form of hardware. For example, each unit is a separately disposed processing element, or is integrated into a chip of the apparatuses for implementation. In addition, each unit alternatively is stored in a memory in a form of a program to be invoked by a processing element of the apparatus to perform a function of the unit. In addition, all or some of the units are integrated together, or is implemented independently. The processing element herein further is referred to as a processor, and is an integrated circuit having a signal processing capability. In an implementation process, the steps of the foregoing methods or the foregoing units are implemented by using a hardware integrated logic circuit in the processing element, or is implemented in a form of software invoked by the processing element.

For example, a unit in any one of the foregoing apparatuses are one or more integrated circuits configured to implement the foregoing methods, for example, one or more application-specific integrated circuits (ASICs), one or more microprocessors (DSPs), one or more field programmable gate arrays (FPGAs), or a combination of at least two of the integrated circuits. For another example, when a unit in the apparatus is implemented by a program scheduled by a processing element, the processing element is a general-purpose processor, for example, a central processing unit (CPU) or another processor that invokes the program. For still another example, the units are integrated and implemented in a form of a system-on-a-chip (SOC).

The foregoing unit for receiving (for example, the receiving unit or the communication unit) is an interface circuit of the apparatus, configured to receive a signal from another apparatus. For example, when the apparatus is implemented in a form of a chip, the receiving unit is an interface circuit that is of the chip and that is configured to receive a signal from another chip or apparatus. The foregoing unit for sending (for example, the sending unit or the communication unit) is an interface circuit of the apparatus, configured to send a signal to another apparatus. For example, when the apparatus is implemented in a form of a chip, the sending unit is an interface circuit that is of the chip and that is configured to send a signal to another chip or apparatus.

Figure 27:
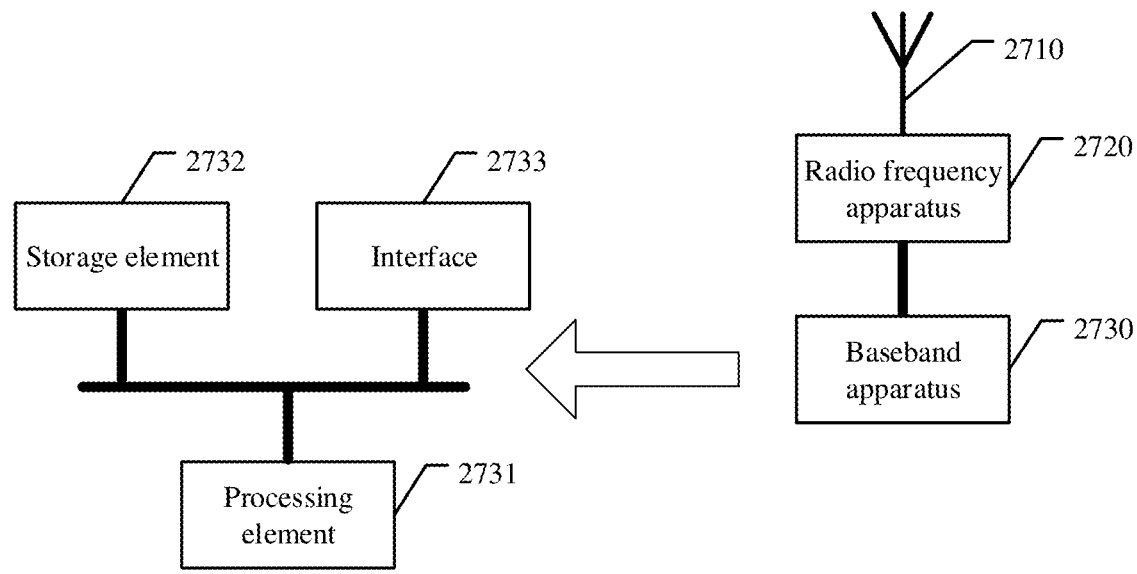
FIG. 27 is a schematic diagram of a structure of a network device according to an embodiment of this application.

FIG. 27 is a schematic diagram of a structure of a network device according to an embodiment of this application. The network device is configured to implement operations of the network device in the foregoing embodiments. As shown in FIG. 27, the network device includes an antenna 2710, a radio frequency apparatus 2720, and a baseband apparatus 2730. The antenna 2710 is connected to the radio frequency apparatus 2720. In an uplink direction, the radio frequency apparatus 2720 receives, through the antenna 2710, information sent by a terminal apparatus, and sends, to the baseband apparatus 2730 for processing, the information sent by the terminal apparatus. In a downlink direction, the baseband apparatus 2730 processes information of the terminal apparatus, and sends the information to the radio frequency apparatus 2720. After processing the information of the terminal apparatus, the radio frequency apparatus 2720 sends the information to the terminal apparatus through the antenna 2710.

The baseband apparatus 2730 includes one or more processing elements 2731, for example, includes a master CPU and another integrated circuit. In addition, the baseband apparatus 2730 further includes a storage element 2732 and an interface 2733. The storage element 2732 is configured to store a program and data. The interface 2733 is configured to exchange information with the radio frequency apparatus 2720, and the interface is, for example, a common public radio interface (CPRI). The foregoing apparatus used for the network device is located in the baseband apparatus 2730. For example, the foregoing apparatus used for the network device is a chip on the baseband apparatus 2730. The chip includes at least one processing element and interface circuit. The processing element is configured to perform the steps of any one of the methods performed by the network device. The interface circuit is configured to communicate with another apparatus. In an implementation, units of the network device that implement the steps in the foregoing method is implemented by a program scheduled by a processing element. For example, the apparatus used for the network device includes a processing element and a storage element. The processing element invokes a program stored in the storage element, to perform the method performed by the network device in the foregoing method embodiments. The storage element is a storage element located on a same chip as the processing element, namely, an on-chip storage element, or is a storage element located on a different chip from the processing element, namely, an off-chip storage element.

In another implementation, units of the network device that implement the steps in the foregoing methods are configured as one or more processing elements. These processing elements are disposed in the baseband apparatus. The processing element herein is an integrated circuit, for example, one or more ASICs, one or more DSPs, one or more FPGAs, or a combination of these types of integrated circuits. These integrated circuits are integrated together to form a chip.

Units of the network device that implement the steps in the foregoing methods are integrated together, and implemented in a form of a system-on-a-chip (SOC). For example, the baseband apparatus includes the SOC chip, configured to implement the foregoing methods. At least one processing element and a storage element is integrated into the chip, and the processing element invokes a program stored in the storage element to implement the foregoing methods performed by the network device. Alternatively, at least one integrated circuit is integrated into the chip, to implement the foregoing methods performed by the network device. Alternatively, with reference to the foregoing implementations, functions of some units are implemented by a program invoked by the processing element, and functions of some units are implemented by the integrated circuit.

The foregoing apparatus used for the network device includes at least one processing element and an interface circuit. The at least one processing element is configured to perform any one of the methods that are provided in the foregoing method embodiments and performed by the network device. The processing element performs some or all steps performed by the network device, in a first manner by invoking the program stored in the storage element; or performs some or all steps performed by the network device, in a second manner by using a hardware integrated logic circuit in the processing element in combination with instructions; or certainly performs, by combining the first manner and the second manner, some or all steps performed by the network device.

As described above, the processing element herein is a general-purpose processor, for example, a CPU, or is one or more integrated circuits configured to implement the foregoing methods, for example, one or more ASICs, one or more microprocessors DSPs, one or more FPGAs, or a combination of at least two of the integrated circuits. The storage element is one memory, or is a general term of a plurality of storage elements.

Figure 28:
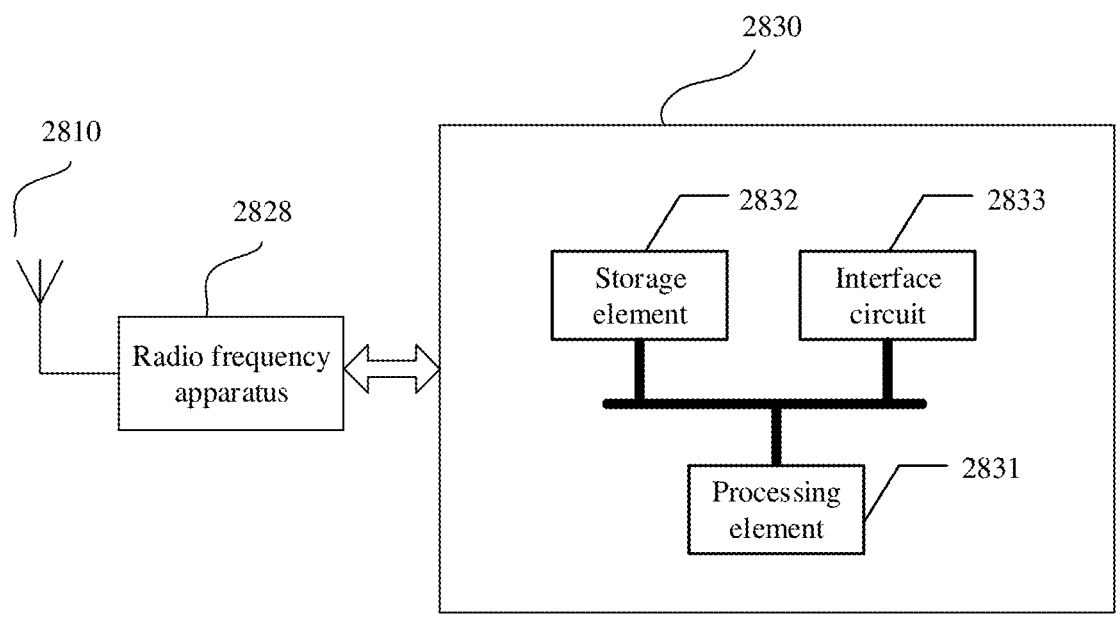
FIG. 28 is a schematic diagram of a structure of a terminal device according to an embodiment of this application.

FIG. 28 is a schematic diagram of a structure of a terminal apparatus according to an embodiment of this application. The terminal apparatus is configured to implement operations of the terminal in the foregoing embodiments. As shown in FIG. 28, the terminal apparatus includes an antenna 2810, a radio frequency part 2828, and a signal processing part 2830. The antenna 2810 is connected to the radio frequency part 2828. In a downlink direction, the radio frequency part 2828 receives, through the antenna 2810, information sent by an access network device, and sends, to the signal processing part 2830 for processing, the information sent by the access network device. In an uplink direction, the signal processing part 2830 processes information of the terminal apparatus, and sends the information to the radio frequency part 2828. After processing the information of the terminal apparatus, the radio frequency part 2828 sends the information to the access network device through the antenna 2810.

The signal processing section 2830 is configured to process data at each communication protocol layer. The signal processing part 2830 is a subsystem of the terminal apparatus, and the terminal apparatus further includes another subsystem. For example, a central processing subsystem is configured to process an operating system and an application layer of the terminal apparatus. For another example, a peripheral subsystem is configured to connect to another device. The signal processing part 2830 is a chip disposed separately. Optionally, the foregoing apparatus is in the signal processing part 2830.

The signal processing part 2830 includes one or more processing elements 2831, for example, includes a master CPU and another integrated circuit. In addition, the signal processing part 2830 further includes a storage element 2832 and an interface circuit 2833. The storage element 2832 is configured to store data and a program, and a program for performing the method performed by the terminal apparatus in the foregoing method is or is unable to be stored in the storage element 2832, for example, stored in a memory outside the signal processing part 2830. During use, the signal processing part 2830 loads the program into a cache for use. The interface circuit 2833 is configured to communicate with the apparatus. The foregoing apparatus is in the signal processing part 2830. The signal processing part 2830 is implemented by using a chip. The chip includes at least one processing element and an interface circuit, the processing element is configured to perform steps of any method performed by the foregoing terminal apparatus, and the interface circuit is configured to communicate with another apparatus. In an implementation, units that implement the steps in the foregoing method is implemented by a program scheduled by a processing element. For example, the apparatus includes a processing element and a storage element. The processing element invokes a program stored in the storage element, to perform the method performed by the terminal apparatus in the foregoing method embodiments. The storage element is a storage element located on a same chip as the processing element, namely, an on-chip storage element.

In another implementation, the program used to perform the method performed by the terminal apparatus in the foregoing methods are in a storage element located on a different chip from the processing element, namely, an off-chip storage element. In this case, the processing element invokes or loads the program from the off-chip storage element to the on-chip storage element, to invoke and perform the method performed by the terminal apparatus in the foregoing method embodiments.

In still another implementation, units of the terminal apparatus that implement the steps in the foregoing methods are configured as one or more processing elements. These processing elements are disposed on the signal processing part 2830. The processing element herein is an integrated circuit, for example, one or more ASICs, one or more DSPs, one or more FPGAs, or a combination of these types of integrated circuits. These integrated circuits are integrated together to form a chip.

Units that implement the steps in the foregoing methods are integrated together, and implemented in a form of a system-on-a-chip (SOC). The SOC chip is configured to implement the foregoing methods. At least one processing element and a storage element is integrated into the chip, and the processing element invokes a program stored in the storage element to implement the foregoing methods performed by the terminal apparatus. Alternatively, at least one integrated circuit is integrated into the chip, to implement the foregoing methods performed by the terminal apparatus. Alternatively, with reference to the foregoing implementations, functions of some units are implemented by a program invoked by the processing element, and functions of some units are implemented by the integrated circuit.

The foregoing apparatus includes at least one processing element and an interface circuit. The at least one processing element is configured to perform any one of the methods that are provided in the foregoing method embodiments and performed by the terminal apparatus. The processing element performs some or all steps performed by the terminal apparatus, in a first manner by invoking the program stored in the storage element; or performs some or all steps performed by the terminal apparatus, in a second manner by using a hardware integrated logic circuit in the processing element in combination with instructions; or certainly performs, by combining the first manner and the second manner, some or all steps performed by the terminal apparatus.

As described above, the processing element herein is a general-purpose processor, for example, a CPU, or is one or more integrated circuits configured to implement the foregoing methods, for example, one or more ASICs, one or more microprocessors DSPs, one or more FPGAs, or a combination of at least two of the integrated circuits. The storage element is one memory, or is a general term of a plurality of storage elements.

Figure 29:
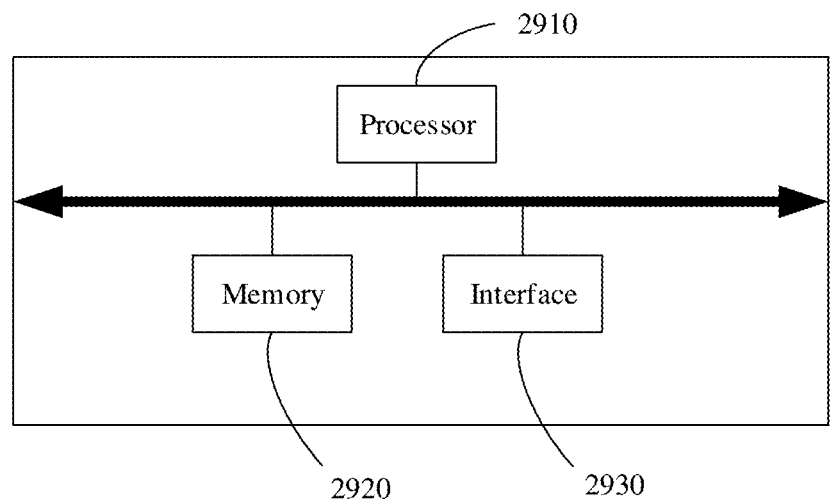
FIG. 29 is a schematic diagram of a structure of an Ethernet frame compression apparatus according to an embodiment of this application.

FIG. 29 is a schematic diagram of a structure of a compression end device according to an embodiment of this application. The compression end device is configured to implement operations of the compression end in the foregoing embodiments. As shown in FIG. 29, the compression end device includes a processor 2910, a memory 2920, and an interface 2930. The processor 2910, the memory 2920, and the interface 2930 are connected by using signals.

The method performed by the compression end device in the foregoing embodiment is implemented by the processor 2910 invoking a program stored in the memory 2920. The apparatus used for the compression end device includes a memory and a processor. The memory is configured to store a program, and the program is invoked by the processor to perform the method performed by the compression end device in the foregoing method embodiments. The processor herein is an integrated circuit having a signal processing capability, for example, a CPU. The apparatus used for the compression end device is implemented by using one or more integrated circuits configured to implement the foregoing method, for example, one or more ASICs, one or more microprocessors DSPs, one or more FPGAs, or a combination of at least two of the integrated circuits. Alternatively, the foregoing implementations are combined.

Figure 30:
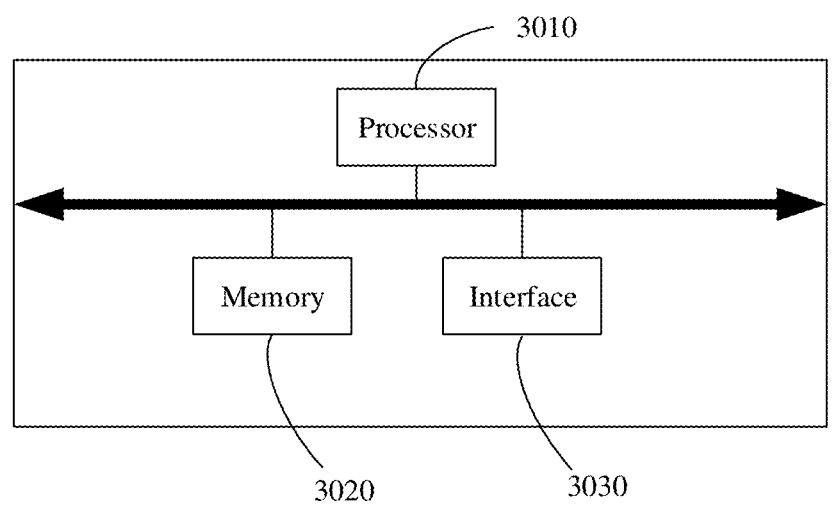
FIG. 30 is a schematic diagram of a structure of an Ethernet frame decompression apparatus according to an embodiment of this application.

FIG. 30 is a schematic diagram of a structure of a decompression end device according to an embodiment of this application. The decompression end device is configured to implement operations of the decompression end in the foregoing embodiments. As shown in FIG. 30, the decompression end device includes a processor 3010, a memory 3020, and an interface 3030. The processor 3010, the memory 3020, and the interface 3030 are connected by using signals.

The method performed by the decompression end device in the foregoing embodiment is implemented by the processor 3010 invoking a program stored in the memory 3020. The apparatus used for the decompression end device includes a memory and a processor. The memory is configured to store a program, and the program is invoked by the processor to perform the method performed by the decompression end device in the foregoing method embodiments. The processor herein is an integrated circuit having a signal processing capability, for example, a CPU. The apparatus used for the decompression end device is implemented by using one or more integrated circuits configured to implement the foregoing method, for example, one or more ASICs, one or more microprocessors DSPs, one or more FPGAs, or a combination of at least two of the integrated circuits. Alternatively, the foregoing implementations are combined.

A person of ordinary skill in the art understands that all or some of the steps of the method embodiments are implemented by a program instructing related hardware. The program is stored in a computer-readable storage medium. When the program is executed, the steps of the method embodiments are performed. The foregoing storage medium includes: any medium that stores program code, such as a ROM, a RAM, a magnetic disk, or an optical disc.

What is claimed is:

1. An Ethernet header compression method, comprising:
receiving, by a compression end, a first Ethernet frame, wherein an Ethernet header of the first Ethernet frame comprises a first to-be-compressed field;
determining, by the compression end, first compression information of the Ethernet header of the first Ethernet frame based on one or more context entries and the first to-be-compressed field, wherein the one or more context entries each comprise: compression information including a context identifier (CID), a compressed-field value corresponding to the CID, and an availability indication indicating whether the compression information is used for compression, the first compression information including a first CID; and
compressing, by the compression end, the Ethernet header of the first Ethernet frame based on the first compression information.

2. The method according to claim 1, further comprising:
determining, by the compression end, that a first availability indication corresponding the first compression information indicates that the first compression information is not used for compression;
sending, by the compression end to a decompression end, the first compression information and a first compressed field value corresponding to the first to-be-compressed field; and
setting, by the compression end, the first availability indication to a first value when the compression end determines that the first compression information and the first compressed field value are correctly received by the decompression end, wherein the first value is used to indicate that the compression information is used for compression.

3. The method according to claim 1, wherein the compression information in each of the plurality of context entries further comprises a profile identifier (ID).

4. The method according to claim 3, further comprising:
sending, by the compression end to a decompression end, a packet data convergence protocol (PDCP) data protocol data unit (PDU) or a PDCP control PDU, the PDCP data PDU or the PDCP control PDU comprising the first CID, a first profile ID corresponding the first CID and a first compressed-field value corresponding to the first CID.

5. An apparatus, applied for a compression end comprising:
at least one processor; and
a memory configured to store instructions that, when executed by the at least one processor, cause the apparatus to perform operations comprising:
receiving, a first Ethernet frame, wherein an Ethernet header of the first Ethernet frame comprises a first to-be-compressed field;
determining, first compression information of the Ethernet header of the first Ethernet frame based on one or more context entries and the first to-be-compressed field, wherein the one or more context entries each comprise: compression information including a context identifier (CID), a compressed-field value corresponding to the CID, and an availability indication indicating whether the compression information is used for compression, the first compression information including a first CID; and
compressing, the Ethernet header of the first Ethernet frame based on the first compression information.

6. The apparatus according to claim 5, wherein the instructions, when executed by the at least one processor, further cause the apparatus to perform operations comprising:
receiving, from the compression end, a first correspondence between the first compression information and a first compressed field value;
sending, to the compression end, feedback information indicating a receiving status of the first correspondence; and
setting the first availability indication to a first value indicating that the compression information is used for compression.

7. The apparatus according to claim 5, wherein the compression information in each of the plurality of context entries further comprises a profile identifier (ID).

8. The apparatus according to claim 7, wherein the instructions, when executed by the at least one processor, further cause the apparatus to perform operations comprising:
receiving, from the compression end, a packet data convergence protocol (PDCP) data protocol data unit (PDU) or a PDCP control PDU, the PDCP data PDU or the PDCP control PDU comprising the first CID, a first profile ID corresponding the first CID and a first compressed-field value corresponding to the first CID.

9. An apparatus, applied for a decompression end, comprising:
at least one processor; and
a memory configured to store instructions that, when executed by the at least one processor, cause the apparatus to perform operations comprising:
receiving, a first Ethernet frame including a first context identifier (CID);
determining, based on the first CID, a first correspondence from one or more context entries each comprising: compression information including a context identifier (CID), a compressed-field value corresponding to the CID, and an availability indication indicating whether the compression information is used for compression, wherein the first correspondence comprises first compression information with the first CID and a compressed-field value of a first-to-be decompressed field; and
decompressing, an Ethernet header of the first Ethernet frame based on the first compression information and the compressed-field value of the first to-be-decompressed field in the first correspondence.

10. The apparatus according to claim 9, wherein the instructions, when executed by the at least one processor, further cause the apparatus to perform operations comprising:
receiving, from the compression end, a first correspondence between the first compression information and a first compressed field value;

sending, to the compression end, feedback information indicating a receiving status of the first correspondence; and setting the first availability indication to a first value indicating that the compression information is used for compression.

11. The apparatus according to claim 9, wherein the compression information in each of the plurality of context entries further comprises a profile identifier (ID).

12. The apparatus according to claim 11, wherein the instructions, when executed by the at least one processor, further cause the apparatus to perform operations comprising:

receiving, from the compression end, a packet data convergence protocol (PDCP) data protocol data unit (PDU) or a PDCP control PDU, the PDCP data PDU or the PDCP control PDU comprising the first CID, a first profile ID corresponding the first CID and a first compressed-field value corresponding to the first CID.

\* \* \* \* \*